US010787603B2

(12) United States Patent
Haghighi et al.

(10) Patent No.: US 10,787,603 B2
(45) Date of Patent: *Sep. 29, 2020

(54) COMPOSITIONS AND METHODS FOR TREATING SUBTERRANEAN FORMATIONS

(71) Applicant: TenEx Technologies, LLC, Berwyn, PA (US)

(72) Inventors: Mohammad Farid Ehtemam Haghighi, Berwyn, PA (US); Rui Zhang, Berwyn, PA (US); Parbatee Jagassar, Berwyn, PA (US); Mohamed Tarek, Cairo (EG); Amr Radwan, Berwyn, PA (US); Khosrow Naderi, Berwyn, PA (US); Dhiraj Gunda, King of Prussia, PA (US)

(73) Assignee: TENEX TECHNOLOGIES, LLC, Berwyn, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/577,451

(22) Filed: Sep. 20, 2019

(65) Prior Publication Data
US 2020/0017756 A1 Jan. 16, 2020

Related U.S. Application Data

(63) Continuation of application No. 16/008,424, filed on Jun. 14, 2018.

(Continued)

(51) Int. Cl.
C09K 8/584 (2006.01)
C09K 8/52 (2006.01)
(Continued)

(52) U.S. Cl.
CPC ............... C09K 8/584 (2013.01); C09K 8/52 (2013.01); C09K 8/58 (2013.01); C09K 8/602 (2013.01);
(Continued)

(58) Field of Classification Search
CPC .... C09K 2208/10; C09K 8/584; C09K 8/845; B21B 21/00
See application file for complete search history.

(56) References Cited

U.S. PATENT DOCUMENTS 5,910,467 A   6/1999 Bragg
6,312,515 B1  11/2001 Barlet-Gouedard et al.
(Continued)

FOREIGN PATENT DOCUMENTS

WO   WO-2007068870 A1 *  6/2007  ........... C04B 41/009
WO      2014011592 A1     1/2014
(Continued)

OTHER PUBLICATIONS

Cheraghian et al., "Effect of Nanoclay on Heavy Oil Recovery During Polymer Flooding", Petroleum Science and Technology, 2015, 33(9), pp. 999-1007.
(Continued)

Primary Examiner — Frances Tischler
(74) Attorney, Agent, or Firm — Troutman Pepper Hamilton Sanders LLP

(57) ABSTRACT

The disclosure generally refers to compositions and methods for treating subterranean formations that improve the recovery of hydrocarbons from the subterranean formations. The compositions include positively and negatively charged nanoparticles suspended in a carrier fluid that is not a drilling fluid and is free of cement and foaming agents. The populations of nanoparticles may be of different sizes, different materials, and comprise different ratios. The composition may also include: surface-active agents, such as surfactants, polymers; detergents; crystal modifiers; stabilizers, or hydronium. In some embodiments, the surface-active agents may bind to the surface of the positively or negatively (Continued)

charged nanoparticles. A subterranean formation may then be injected with the composition.

20 Claims, 10 Drawing Sheets
(3 of 10 Drawing Sheet(s) Filed in Color)

Related U.S. Application Data

(60) Provisional application No. 62/586,249, filed on Nov. 15, 2017, provisional application No. 62/521,068, filed on Jun. 16, 2017.

(51) Int. Cl.
*C09K 8/58* (2006.01)
*C09K 8/60* (2006.01)
*C09K 8/88* (2006.01)
*C09K 8/84* (2006.01)

(52) U.S. Cl.
CPC .............. *C09K 8/604* (2013.01); *C09K 8/845* (2013.01); *C09K 8/88* (2013.01); *C09K 2208/10* (2013.01)

(56) References Cited

U.S. PATENT DOCUMENTS

| | | |
|---|---|---|
| 6,586,371 B1 | 7/2003 | Maroy et al. |
| 6,586,483 B2 | 7/2003 | Kolb et al. |
| 6,765,049 B2 | 7/2004 | Lorah et al. |
| 6,910,537 B2 | 6/2005 | Brown et al. |
| 7,033,975 B2 | 4/2006 | Baran, Jr. et al. |
| 7,036,592 B2 | 5/2006 | Nguyen et al. |
| 7,081,439 B2 | 7/2006 | Sullivan et al. |
| 7,528,096 B2 | 5/2009 | Brannon et al. |
| 7,559,369 B2 | 7/2009 | Roddy et al. |
| 7,784,542 B2 | 8/2010 | Roddy et al. |
| 7,806,183 B2 | 10/2010 | Roddy et al. |
| 7,892,352 B2 | 2/2011 | Roddy et al. |
| 7,919,183 B2 | 4/2011 | McDaniel et al. |
| 8,056,630 B2 | 11/2011 | Huang et al. |
| 8,062,670 B2 | 11/2011 | Baran, Jr. et al. |
| 8,119,574 B2 | 2/2012 | Panga et al. |
| 8,476,203 B2 | 7/2013 | Patil et al. |
| 8,586,512 B2 | 11/2013 | Roddy et al. |
| 8,598,093 B2 | 12/2013 | Roddy et al. |
| 8,685,903 B2 | 4/2014 | Ravi et al. |
| 8,691,737 B2 | 4/2014 | Chatterji et al. |
| 8,741,818 B2 | 6/2014 | Ravi et al. |
| 8,765,646 B2 | 7/2014 | Panga et al. |
| 8,783,352 B2 | 7/2014 | Chenevert et al. |
| 8,822,386 B2 | 9/2014 | Quintero et al. |
| 8,834,624 B2 | 9/2014 | Soltanian et al. |
| 8,931,554 B2 | 1/2015 | Norman |
| 8,940,670 B2 | 1/2015 | Patil et al. |
| 8,997,868 B2 | 4/2015 | Nguyen et al. |
| 9,006,151 B2 | 4/2015 | Amanullah et al. |
| 9,040,468 B2 | 5/2015 | Loiseau et al. |
| 9,133,386 B2 | 9/2015 | Kumar |
| 9,133,387 B2 | 9/2015 | Loiseau et al. |
| 9,169,431 B2 | 10/2015 | Crews et al. |
| 9,199,879 B2 | 12/2015 | Thaemlitz et al. |
| 9,206,344 B2 | 12/2015 | Roddy et al. |
| 9,353,308 B2 | 5/2016 | Soltanian et al. |
| 9,376,648 B2 | 6/2016 | Gartstein et al. |
| 9,388,335 B2 | 7/2016 | Loiseau et al. |
| 9,435,198 B2 | 9/2016 | Chenevert et al. |
| 9,512,346 B2 | 12/2016 | Roddy et al. |
| 9,512,351 B2 | 12/2016 | Roddy et al. |
| 9,512,352 B2 | 12/2016 | Roddy et al. |
| 9,611,422 B2 | 4/2017 | Suresh et al. |
| 2009/0029878 A1 | 1/2009 | Bicerano |
| 2009/0082243 A1 | 3/2009 | Brooker et al. |
| 2009/0272534 A1 | 11/2009 | Huang |
| 2010/0075874 A1 | 3/2010 | Perera Mercado et al. |
| 2010/0096139 A1 | 4/2010 | Holcomb et al. |
| 2012/0267102 A1 | 10/2012 | Huang et al. |
| 2013/0274149 A1 | 10/2013 | Lafitte et al. |
| 2014/0090842 A1 | 4/2014 | Patil et al. |
| 2014/0096964 A1 | 4/2014 | Chakraborty et al. |
| 2014/0116695 A1 | 5/2014 | Maghrabi et al. |
| 2014/0213488 A1 | 7/2014 | Jamison et al. |
| 2014/0290692 A1 | 10/2014 | Hall et al. |
| 2014/0290958 A1 | 10/2014 | Marr et al. |
| 2014/0305649 A1 | 10/2014 | Tang et al. |
| 2014/0349894 A1 | 11/2014 | Quintero et al. |
| 2014/0374095 A1 | 12/2014 | Ladva et al. |
| 2015/0065398 A1 | 3/2015 | Gartland et al. |
| 2015/0072902 A1 | 3/2015 | Lafitte et al. |
| 2015/0075798 A1 | 3/2015 | Tang et al. |
| 2015/0114641 A1 | 4/2015 | Bestaoui-Spurr et al. |
| 2015/0198018 A1 | 7/2015 | Farajzadeh et al. |
| 2015/0210912 A1 | 7/2015 | Amanullah et al. |
| 2015/0218435 A1 | 8/2015 | Suresh et al. |
| 2015/0252251 A1 | 9/2015 | Jiang et al. |
| 2016/0053158 A1 | 2/2016 | Roddy et al. |
| 2016/0060503 A1 | 3/2016 | Chakraborty et al. |
| 2016/0108327 A1 | 4/2016 | Pulikkathara et al. |
| 2016/0137912 A1 | 5/2016 | Sherman et al. |
| 2016/0160113 A1 | 6/2016 | Nguyen et al. |
| 2016/0160116 A1 | 6/2016 | Al-Otaibi et al. |
| 2016/0168443 A1 | 6/2016 | Lafitte et al. |
| 2016/0264462 A1 | 9/2016 | Soltanian et al. |
| 2016/0340512 A1 | 11/2016 | Baran, Jr. |
| 2016/0347986 A1 | 12/2016 | Nguyen et al. |
| 2016/0362594 A1 | 12/2016 | Rojas et al. |
| 2016/0369157 A1 | 12/2016 | Agrawal et al. |
| 2016/0369158 A1 | 12/2016 | Patino |
| 2016/0376490 A1 | 12/2016 | Salla et al. |
| 2016/0376492 A1* | 12/2016 | Chakraborty .......... C09K 8/592 166/267 |
| 2016/0376495 A1 | 12/2016 | Nguyen et al. |
| 2017/0015896 A1 | 1/2017 | Cox et al. |
| 2017/0058186 A1 | 3/2017 | Oghena et al. |
| 2017/0058187 A1 | 3/2017 | Mansour |
| 2017/0073568 A1 | 3/2017 | Roddy |
| 2017/0088762 A1 | 3/2017 | Zhang et al. |
| 2018/0002595 A1* | 1/2018 | Neil ...................... C09K 8/592 |

FOREIGN PATENT DOCUMENTS

| | | | |
|---|---|---|---|
| WO | 2014020061 A1 | 2/2014 | |
| WO | 2016016477 A1 | 2/2016 | |
| WO | 2016048286 A1 | 3/2016 | |
| WO | 2016081276 A1 | 5/2016 | |
| WO | WO-2016115142 A1 * | 7/2016 | ............ C09K 8/592 |
| WO | 2016133629 A1 | 8/2016 | |
| WO | 2016137448 A1 | 9/2016 | |
| WO | 2016182542 A1 | 11/2016 | |
| WO | 2016196332 A1 | 12/2016 | |
| WO | 2017071985 A1 | 5/2017 | |

OTHER PUBLICATIONS

Sharonova et al., "Synthesis of positively and negatively charged silver nanoparticles and their desposition on the surface of titanium", IOP Conference Series: Materials Science and Engineering, 2016, 116, pp. 012009.

Yuan et al., "Allophane nanoclay for the removal of phosphorus in water and wastewater", Science and Technology Advanced Mater, Elsevier Science, 2007, 8 (1-2), pp. 60-62.

Zolfaghari et al., "Preparation and characterization of nanocomposite hydrogels based on polyacrylamide for enhanced oil recovery applications", Journal of Applied Polymer Science, 2006, 100(3), pp. 2096-2103.

Moghadam et al., "Effect of Nanoclay along with other Effective Parameters on Gelation Time of Hydro Polymer βels", Journal of

(56) References Cited

OTHER PUBLICATIONS

Macromolecular Science Part B. Physics, 2012, 51(10), pp. 2015-2025.

* cited by examiner

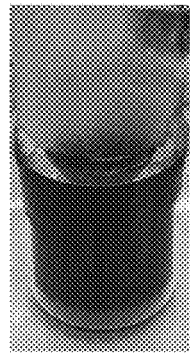 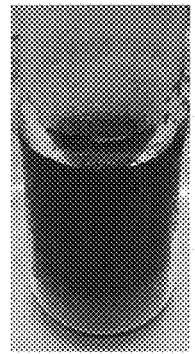 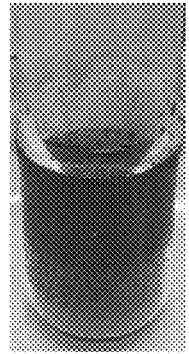 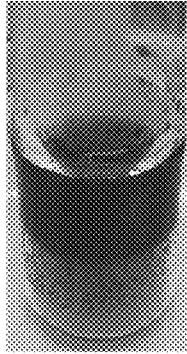 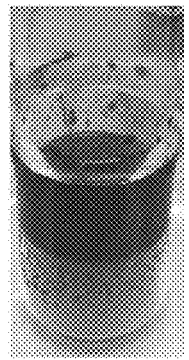
FIG. 9A     FIG. 9B     FIG. 9C     FIG. 9D     FIG. 9E
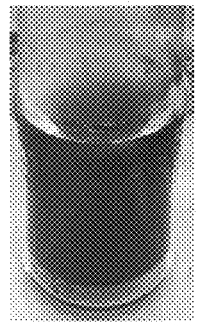 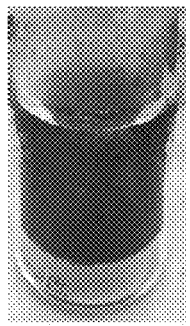 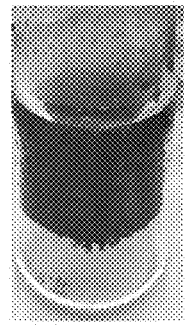 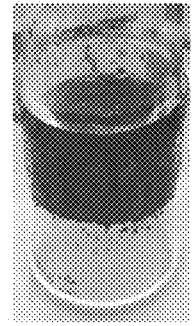 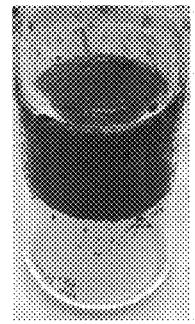
FIG. 10A    FIG. 10B    FIG. 10C    FIG. 10D    FIG. 10E
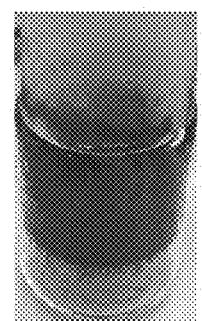 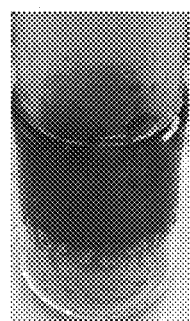 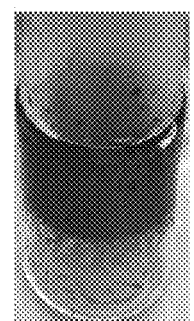 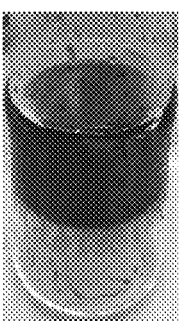 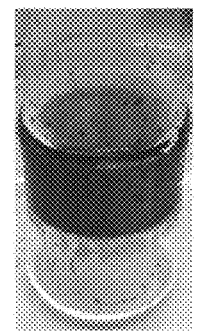
FIG. 11A    FIG. 11B    FIG. 11C    FIG. 11D    FIG. 11E

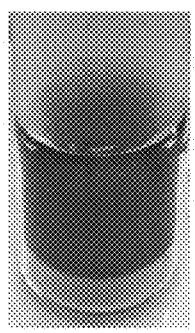 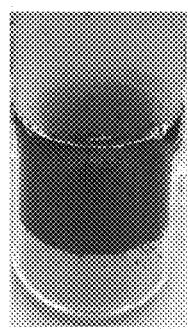  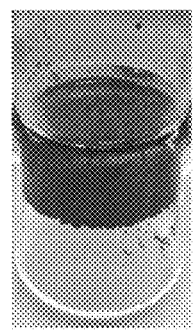 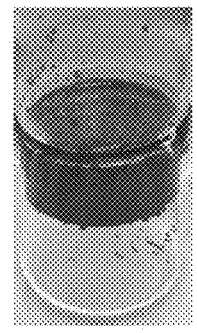
FIG. 12A　　FIG. 12B　　FIG. 12C　　FIG. 12D　　FIG. 12E
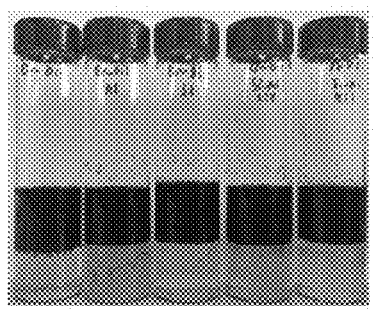 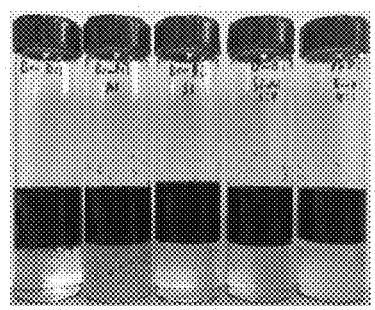 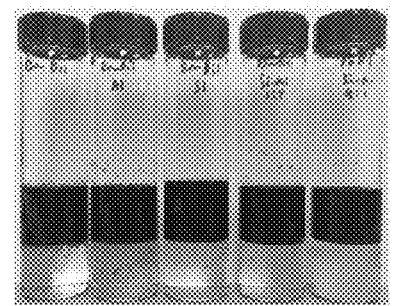
FIG. 13A　　　　FIG. 13B　　　　FIG. 13C

COMPOSITIONS AND METHODS FOR TREATING SUBTERRANEAN FORMATIONS

RELATED APPLICATIONS

This application is a continuation of U.S. application Ser. No. 16/008,424, which claims the benefit of priority to U.S. Provisional Patent Application Ser. No. 62/521,068, filed on Jun. 16, 2017, and U.S. Provisional Patent Application Ser. No. 62/586,249, filed on Nov. 15, 2017, the contents of each are hereby incorporated in this application by reference in their entirety.

FIELD

The disclosure generally refers to compositions and methods for treating subterranean formations that improve the recovery of hydrocarbons from the subterranean formations.

BACKGROUND

Nanoparticle dispersions have been used to improve the efficiency of fluids and additives during numerous oil well reservoir applications. For example, nanoparticle fluid systems have been used in work-over squeeze treatments for mitigation of paraffin and asphaltene blockage, and recovery of residual oil from depleted fields in water flood applications. These processes improve the removal of phases such as oil, gas, damaging material like paraffin, polymer, biofilm, or scale, from rock substrate. Fluid systems can be specifically designed for each of these applications by selecting various particles, with or without surface modifications, or with alterations to the ionic nature of the carrier fluid. What is needed in the industry are new game changing chemistries such as nanoparticle dispersions which provide superior performance.

SUMMARY

In some embodiments, an aqueous composition is provided that comprises a carrier fluid comprising at least one population of positively charged nanoparticles; and at least one population of negatively charged nanoparticles; wherein the composition is not a drilling fluid; and wherein the composition is free of cement and foaming agents. In some embodiments the nanoparticles may be silica and alumina. In some embodiments, the aqueous solution may also include elements selected from a group consisting of: sodium dodecylbenzene sulfonate (SDBS), cetyltrimethylammonium bromide (CTAB), TRITON™ X-100 (t-octylphenoxy-polyethoxyethanol), poly(vinylpyrrolidone), methanol, butanol, sodium chloride, calcium chloride dihydrate, and magnesium chloride hexahydrate, or a combination thereof. Furthermore, in a non-limiting embodiment, the composition may comprise at least two populations of positively charged nanoparticles, wherein the least two populations of positively charged nanoparticles have different sizes and/or are different materials. In some embodiments, the composition comprises at least two populations of negatively charged nanoparticles, wherein the least two populations of negatively charged nanoparticles have different sizes and/or are different materials. In some embodiments, the ratio of positively charged nanoparticles to negatively charged nanoparticles is from about 1:1 to about 4:1. In some embodiments, the ratio of negatively charged nanoparticles to positively charged nanoparticles is from about 1:1 to about 4:1.

In some embodiments, an aqueous composition is provided that comprises a first carrier fluid comprising at least one population of positively charged nanoparticles; and a second carrier fluid comprising at least one population of negatively charged nanoparticles; wherein the composition is not a drilling fluid; and wherein the composition is free of cement and foaming agents. In some embodiments the composition comprises at least two populations of positively charged nanoparticles, wherein the least two populations of positively charged nanoparticles have different sizes and/or are different materials. In some embodiments, the composition comprises at least two populations of negatively charged nanoparticles, wherein the least two populations of negatively charged nanoparticles have different sizes and/or are different materials. In some embodiments, the ratio of positively charged nanoparticles to negatively charged nanoparticles is from about 1:1 to about 4:1. In some embodiments, the ratio of negatively charged nanoparticles to positively charged nanoparticles is from about 1:1 to about 4:1.

In some embodiments, the composition described herein comprises a surface-active agent. In some embodiments, the surface-active agent is a polymer and/or surfactant. In some embodiments, the surface-active agent may be bound to the surface of the positively charged and/or negatively charged nanoparticles. In some embodiments, the surface-active agent is selected from the group consisting of polyvinylpyrrolidone, fatty acid salts, sulfates, sulfonates, phosphoric surfactants, alkyl-ammoniums, alkyl-amines, fatty amine surfactants, quaternary ammonium surfactant, dodecyl benzene sulfonate, cetyltrimethylammonium bromide, an alkyl ether sulfate surfactant, a dodecyl benzene sulfonate surfactant, an alpha olefin sulfonate surfactant, an amphoteric surfactant, or any combination thereof. In some embodiments, the surface-active agent comprises up to about 5 wt % of the aqueous composition.

In some embodiments, the aqueous composition comprises at least one surfactant. In some embodiments, at least one surfactant binds to the surface of the negatively charged and/or positively charged nanoparticles. In some embodiments, at least some of the at least one surfactant is solubilized in the carrier fluid. In some embodiments, the at least one surfactant is a non-foaming surfactant and/or does not produce a foam in the aqueous composition.

In some embodiments, the compositions described herein comprises a detergent. In some embodiments, the detergent is an ionic detergent or a non-ionic detergent or a mixture of the two. In some embodiments, the non-ionic detergent is TRITON™ X-100 (t-octylphenoxy-polyethoxyethanol), TWEEN® 20 (Polysorbate 20), or any combination thereof.

In some embodiments, the compositions described herein comprise a crystal modifier. In some embodiments, the crystal modifier is a copolymer. In some embodiments, the crystal modifier is ethylene-vinyl acetate (EVA), polyethylene-butene (PEB), or polyethylene-propylene (PEP), or any combination thereof.

In some embodiments, the compositions described herein comprises a stabilizer. In some embodiments, the stabilizer is a glycol ester. In some embodiments, the stabilizer is propylene glycol, ethylene glycol, or combinations thereof.

In some embodiments, the compositions described herein comprises a solvent. In some embodiments, the solvent is d-limonene, xylene, or a combination thereof.

In some embodiments, the nanoparticles in the composition have a size from about 1 to about 1000 nanometers as measured by dynamic light scattering (DLS) (Z-average).

In some embodiments, any of the compositions described herein comprise hydronium. In some embodiments, the hydronium binds to the surface of the negatively charged and/or positively charged nanoparticles.

In some embodiments, methods of treating subterranean formations are provided. In some embodiments, the methods comprise injecting into the subterranean formation any of the compositions described herein. In some embodiments, the methods of extracting hydrocarbons from a subterranean formation are provided. In some embodiments, the methods comprise treating the subterranean formation comprising the hydrocarbons with any of the compositions described herein and extracting the hydrocarbons from the subterranean formation. In some embodiments, the treating step comprises injecting the subterranean formation with the aqueous composition. In some embodiments, the treating step comprises injecting the first carrier fluid into the subterranean formation separate from the second carrier fluid.

In some embodiments, methods of preparing any of the compositions described herein are provided. In some embodiments, the methods comprise mixing the at least one population of positively charged nanoparticles into the first carrier fluid; mixing the at least one population of negatively charged nanoparticles into the second carrier fluid; and mixing the first and the second carrier fluid together to form the composition. In some embodiments, the aqueous composition is mixed together in one step. In some embodiments, the first and the second carrier fluids are mixed together to form the aqueous composition before the aqueous composition is injected into a subterranean formation. In some embodiments, the first and the second carrier fluids are mixed together within a subterranean formation to form the aqueous composition. In some embodiments, the aqueous composition is produced in one step and injected into a subterranean formation. In some embodiments, the aqueous composition is diluted with water and is injected into a subterranean formation. In some embodiments, the aqueous composition is injected and separately water is injected into a subterranean formation.

In some embodiments, the composition described herein may be used for tubular cleanouts. Specifically, the composition described herein may be injected into a wellbore, pipeline or other foreign object which had been previously introduced to the subterranean formation. In some embodiments, the composition described herein may be used as an additive to water injection in waterflood and/or other improved oil recovery (IOR) and enhanced oil recovery (EOR) methods to increase the sweep efficiency of the employed method and hence oil production. In some embodiments, the composition described herein may be used in thermal oil recovery as an additive to hot water/steam which may improve the interfacial properties between injected aqueous phase and heavy oil in place, which may lead to increased performance and/or higher recovery. In some embodiments, the composition described herein may be used to potentially enhance bitumen extraction. Specifically, the composition described herein may be added as an additive in the hot water which may improve bitumen separation from sand particles by potentially reducing the interfacial tension between bitumen droplets and water. In some embodiments, the composition described herein may be used for water treatment. Specifically, the composition described herein may be added to water which may cause separation of certain impurities (organic and inorganic residues) through enhancing aggregation of such impurities and their segregation by nanoparticles. In some embodiments, the composition could be used for injection into salt water disposal wells. Specifically, the composition described herein could be injected into salt water disposal wells to help remove and/or loosen the buildup of organic material. The increased buildup in the well makes it necessary to use a higher injection pressure, which can be significantly reduced with treatment.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 9A is a photographic image of the phase separation of a Brine-Oil (1:1) mixture, which includes a 2% Alumina nanofluid additive ten seconds after the mixture is combined.

FIG. 9B is a photographic image of the phase separation of a Brine-Oil (1:1) mixture, which includes a 2% Alumina nanofluid additive thirty seconds after the mixture is combined.

FIG. 9C is a photographic image of the phase separation of a Brine-Oil (1:1) mixture, which includes a 2% Alumina nanofluid additive one minute after the mixture is combined.

FIG. 9D is a photographic image of the phase separation of a Brine-Oil (1:1) mixture, which includes a 2% Alumina nanofluid additive two minutes after the mixture is combined.

FIG. 9E is a photographic image of the phase separation of a Brine-Oil (1:1) mixture, which includes a 2% Alumina nanofluid additive three minutes after the mixture is combined.

FIG. 10A is a photographic image of the phase separation of a Brine-Oil (1:1) mixture, which includes a 2% Silica nanofluid additive ten seconds after the mixture is combined.

FIG. 10B is a photographic image of the phase separation of a Brine-Oil (1:1) mixture, which includes a 2% Silica nanofluid additive thirty seconds after the mixture is combined.

FIG. 10C is a photographic image of the phase separation of a Brine-Oil (1:1) mixture, which includes a 2% Silica nanofluid additive one minute after the mixture is combined.

FIG. 10D is a photographic image of the phase separation of a Brine-Oil (1:1) mixture, which includes a 2% Silica nanofluid additive two minutes after the mixture is combined.

FIG. 10E is a photographic image of the phase separation of a Brine-Oil (1:1) mixture, which includes a 2% Silica nanofluid additive three minutes after the mixture is combined.

FIG. 11A is a photographic image of the phase separation of a Brine-Oil (1:1) mixture, which includes a 2% nanofluid having a 1:4 Silica to Alumina ratio ten seconds after the mixture is combined.

FIG. 11B is a photographic image of the phase separation of a Brine-Oil (1:1) mixture, which includes a 2% nanofluid having a 1:4 Silica to Alumina ratio thirty seconds after the mixture is combined.

FIG. 11C is a photographic image of the phase separation of a Brine-Oil (1:1) mixture, which includes a 2% nanofluid having a 1:4 Silica to Alumina ratio one minute after the mixture is combined.

FIG. 11D is a photographic image of the phase separation of a Brine-Oil (1:1) mixture, which includes a 2% nanofluid having a 1:4 Silica to Alumina ratio two minutes after the mixture is combined.

FIG. 11E is a photographic image of the phase separation of a Brine-Oil (1:1) mixture, which includes a 2% nanofluid having a 1:4 Silica to Alumina ratio three minutes after the mixture is combined.

FIG. 12A is a photographic image of the phase separation of a Brine-Oil (1:1) mixture, which includes a 2% nanofluid having a 4:1 Silica to Alumina ratio ten seconds after the mixture is combined.

FIG. 12B is a photographic image of the phase separation of a Brine-Oil (1:1) mixture, which includes a 2% nanofluid having a 4:1 Silica to Alumina ratio thirty seconds after the mixture is combined.

FIG. 12C is a photographic image of the phase separation of a Brine-Oil (1:1) mixture, which includes a 2% nanofluid having a 4:1 Silica to Alumina ratio one minute after the mixture is combined.

FIG. 12D is a photographic image of the phase separation of a Brine-Oil (1:1) mixture, which includes a 2% nanofluid having a 4:1 Silica to Alumina ratio two minutes after the mixture is combined.

FIG. 12E is a photographic image of the phase separation of a Brine-Oil (1:1) mixture, which includes a 2% nanofluid having a 4:1 Silica to Alumina ratio three minutes after the mixture is combined.

FIG. 13A is a photographic image of the phase separation of a Brine-Oil (1:1) mixture with: (a) no additives, (b) 2% Alumina nanofluid, (c) 2% Silica nanofluid, (d) 2% nanofluid (Si:Al=1:4), (e) 2% nanofluid (Si:Al=4:1) one hour after the mixtures were combined.

FIG. 13B is a photographic image of the phase separation of a Brine-Oil (1:1) mixture with: (a) no additives, (b) 2% Alumina nanofluid, (c) 2% Silica nanofluid, (d) 2% nanofluid (Si:Al=1:4), (e) 2% nanofluid (Si:Al=4:1) two hours after the mixtures were combined.

FIG. 13C is a photographic image of the phase separation of a Brine-Oil (1:1) mixture with: (a) no additives, (b) 2% Alumina nanofluid, (c) 2% Silica nanofluid, (d) 2% nanofluid (Si:Al=1:4), (e) 2% nanofluid (Si:Al=4:1) three hours after the mixtures were combined.

DETAILED DESCRIPTION

Figure 1:
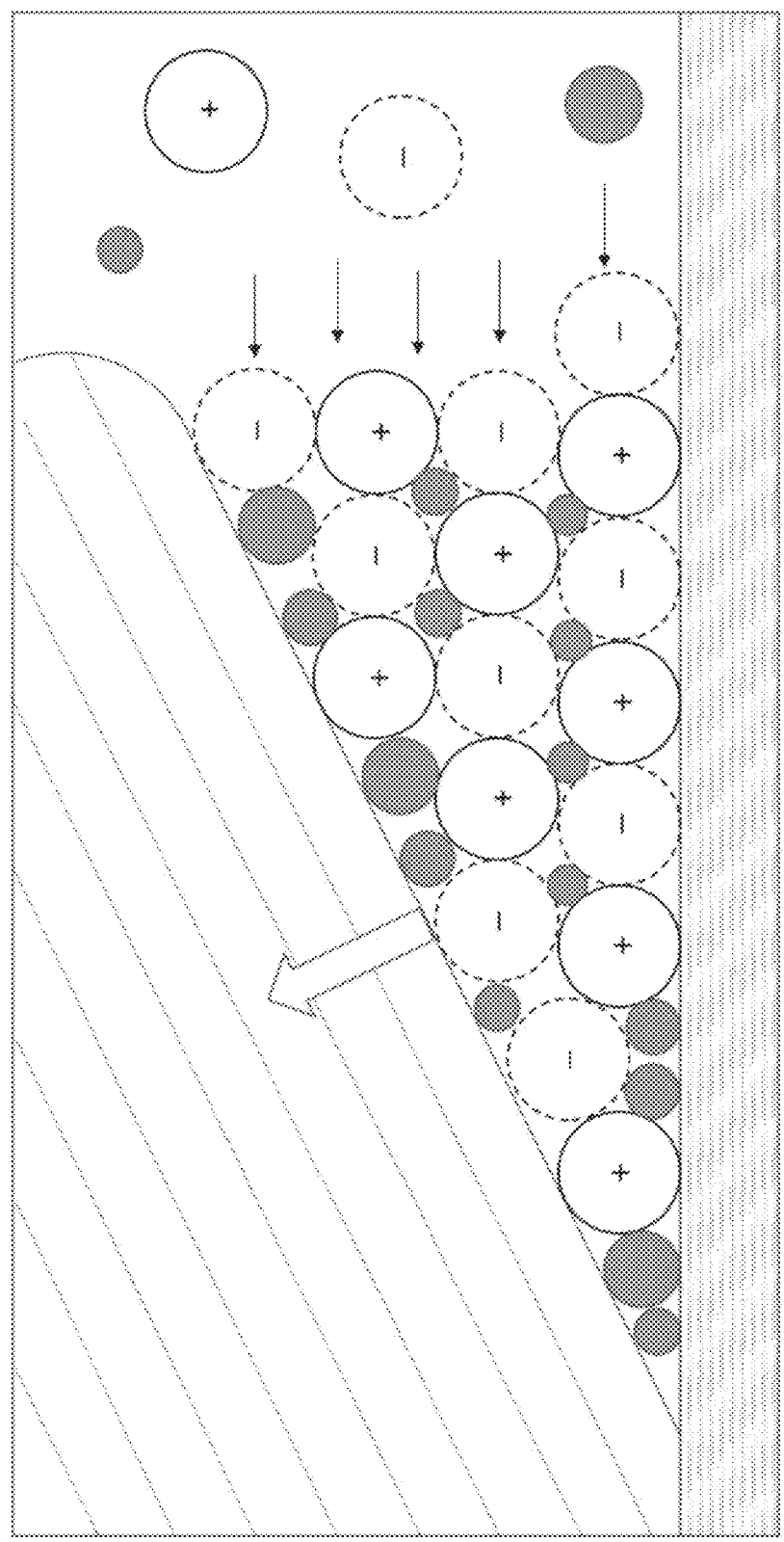
FIG. 1 depicts an illustration showing nanoparticles of different charges and sizes self-assembled into a wedge-like structure between the deposits and the surface of the rock.

Before the present compositions and methods are described, it is to be understood that this disclosure is not limited to the particular processes, compositions, or methodologies described, as these may vary. Moreover, the processes, compositions, and methodologies described in particular embodiments are interchangeable. Therefore, for example, a composition, a mixture, a method of treating, and so on described in some embodiments may be used in any of the methods described in other particular embodiments. It is also to be understood that the terminology used in the description is for the purpose of describing the particular versions or embodiments only and is not intended to limit the scope of the present disclosure which will be limited only by the appended claims. Unless defined otherwise, all technical and scientific terms used herein have the same meanings as commonly understood by one of the ordinary skill in the art. All publications and references mentioned herein are incorporated by reference.

As used herein, the singular forms "a." "an," and "the" include plural reference unless the context clearly dictates otherwise. Thus, for example, a reference to "a composition" includes a plurality of such compositions, and so forth. Thus, for example, a reference to "a nanoparticle" includes a plurality of such particles and equivalents thereof known to those skilled in the art, and so forth.

As used herein, the term "about" means plus or minus 10% of the numerical value of the number with which it is being used. Therefore, about 50% means in the range of 45%-55%. As used herein, when referencing a range, the term "about" modifies both ends of the range even in the term is not used explicitly. For example, the phrase "about 4:1" means a ratio of "about 4:about 1". Additionally, where the term "about" is used, the amount or range is also provided without the term "about." For example, about 2:1 also provides for a ratio of 2:1.

As used herein, the terms "bind" or "binds" refers to the association of two or more molecules or compounds by a chemical bond. In some embodiments, the chemical bond is a covalent bond. In some embodiments, the chemical bond is an ionic bond. In some embodiments, the chemical bond is a metallic bond.

As used herein, the terms "comprising" (and any form of comprising, such as "comprise", "comprises", and "comprised"), "having" (and any form of having, such as "have" and "has"), "including" (and any form of including, such as "includes" and "include"), or "containing" (and any form of containing, such as "contains" and "contain"), are inclusive or open-ended and do not exclude additional, unrecited elements or method steps.

As used herein, the term "nanoparticle" means a particle from about 1 to about 100 nanometers in diameter. In some embodiments, the term "nanoparticle" means a cluster of atoms or molecules with a radius of less than 100 nanometers. In some embodiments, the term nanoparticle is applied to inorganic materials, for example, silica. As used herein, the term "silica" may refer to silica particles or a silica dispersion. As used herein, the term "nanoparticles" can refer to both multiple individual nanoparticles as well as a population of nanoparticles of a particular type. Nanoparticles can also be referred to nanometer-sized particles, and nanopowders are agglomerates of nanoparticles. In some embodiments, the term "nanofluid" means a base fluid, for example, water or oil, that comprises nanoparticles, including fluids with some or all of the nanoparticles in suspension.

As used herein, the term "carrier fluid" means a fluid capable of transporting materials or chemicals into a subterranean formation. Carrier fluids may be aqueous, or oil based. In some embodiments, a carrier fluid comprises nanoparticles. In some embodiments, a carrier fluid comprising nanoparticles is a nanofluid.

As used herein, the term "drilling fluid" means a fluid actively used in the drilling of a wellbore into a subterranean formation. For example, drilling fluids assist the drilling process in various ways, for example, to prevent overheating of the drill bit. In some embodiments, any of the compositions described herein are not drilling fluids.

As used herein, the term "hydrocarbon" means natural compounds comprising carbon and hydrogen that are often used directly as or further refined into energy sources or consumer products. Examples of hydrocarbons include, but are not limited to, petroleum (crude oil) and natural gases (methane, propane, etc.), or combinations thereof.

As used herein, the term "hydrocarbon stimulation techniques" mean methods of improving the flow of hydrocarbons out of subterranean formations. In some embodiments, hydrocarbon stimulation techniques are known as well interventions. In some embodiments, hydrocarbon stimulation techniques include, but are not limited to, wellbore cleaning and hydraulic fracturing.

In some embodiments, wettability refers to the preference of a solid to be in contact with one fluid rather than another. As used herein, the term "water wet" means that a solid surface, for example, porous rock, prefers contact with water over oil. As used herein, the term "oil wet" means that a solid surface prefers contact with oil over water. In some embodiments, changing the wettability of rock present in a subterranean formation from oil wet to water wet increases the flow of hydrocarbons out of the subterranean formation by reducing the preferred contact of the hydrocarbons to the rock. In some embodiments, the preference is not absolute, in that the solid surface can still be in contact with either water or oil. Without wishing to be bound by theory, it is currently understood that the nanoparticles tend to adhere to the rock surface and eventually change its wetting behavior by increasing the tendency of water to spread on the treated surface, hence altering wettability toward more water-wet.

Figure 2:
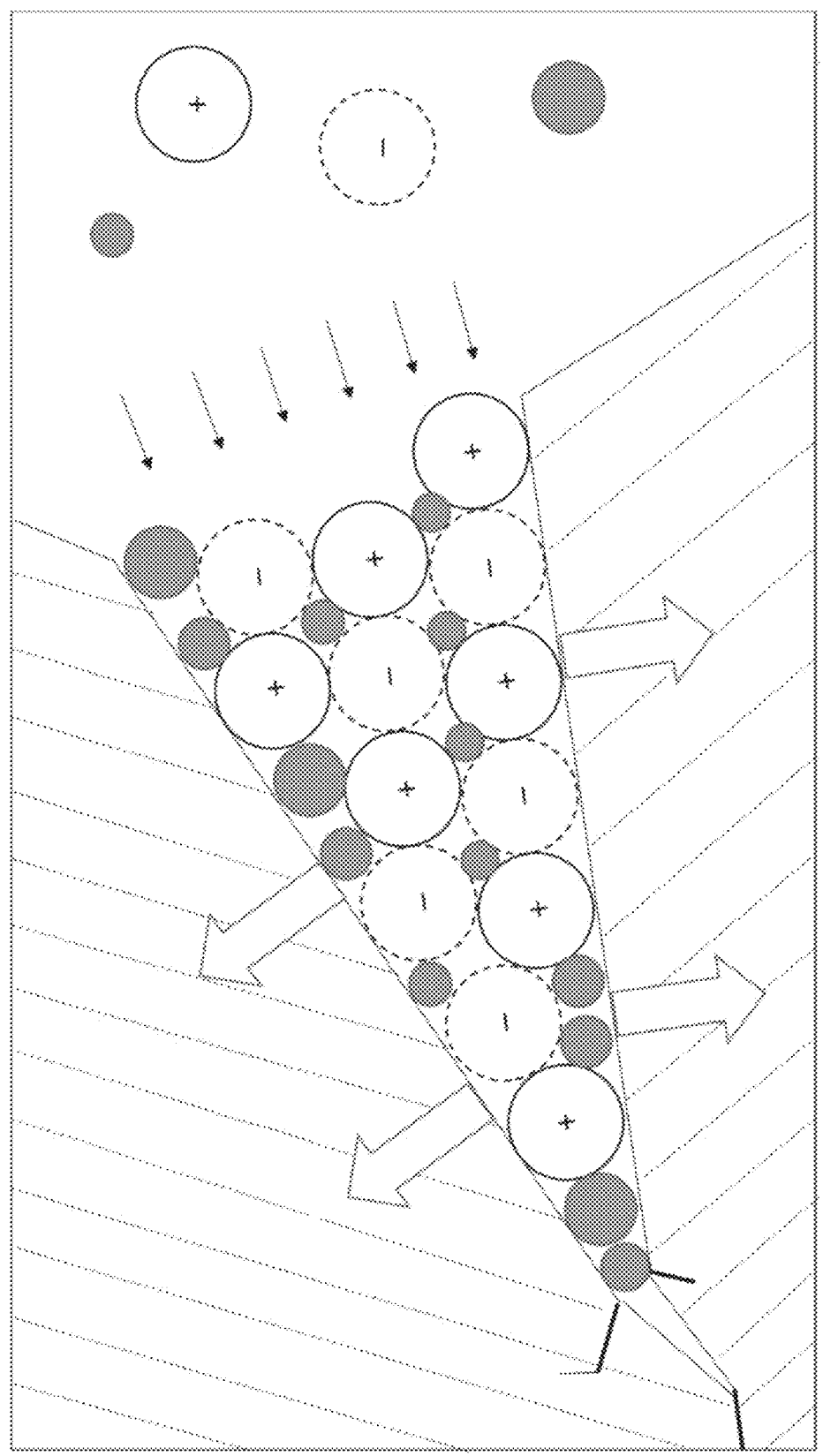
FIG. 2 depicts an illustration showing nanoparticles forming a wedge-like structure comprising nanoparticles of different charges in a micro-crack within the agglomerated organic/inorganic precipitate.

It has been demonstrated herein that the incorporation of nanoparticles, such as those described herein, into compositions used for deposition removal, allows such compositions to function more effectively. Without wishing to be bound by theory, it is currently understood that nanoparticles can exert a structural disjoining pressure when suspended in a fluid. As nanoparticles come in contact with a solid surface, nanoparticles self-assemble into a wedge-like structure through Brownian motion and various forces such as electrostatic and/or van der Waals interaction, driving the particles into a confined region between the deposits and the surface of the rock. As additional nanoparticles are being pushed into the vertex of the confined region, the disjoining pressure becomes large enough to separate the contact line between the deposits and the solid substrate. FIG. 1 depicts one such exemplary embodiment in which nanoparticles with different sizes and charges in a bulk solution, which are subject to a pushing force, self-assemble into a wedge-like structure and apply structural disjoining pressure on an agglomerated organic or inorganic precipitate. FIG. 2 depicts another non-limiting embodiment in which nanoparticles with different sizes and charges in a bulk solution, which are subject to a pushing force, self-assemble into a wedge-like structure and apply structural disjoining pressure on an agglomerated organic or inorganic precipitate.

Disclosed herein are compositions comprising populations of both positively and negatively charged nanoparticles, methods of production of such compositions, and methods of treating a subterranean formation with such compositions. A mixture of both positive and negative charged nanoparticles in a fluid is surprisingly superior to only single charge or non-charged nanoparticles at removing deposits from the solid substrate, for example, wellbores and subterranean formations. As shown in FIGS. 1 and 2, but without being bound to any particular theory, a composition comprising both positive and negative nanoparticle populations is capable of forming superior wedge-like structures, leading to strong structural disjoining pressures between the deposits and the rock surface (FIG. 1) and within the agglomerated organic/inorganic precipitates (FIG. 2). In some embodiments, both the positive and negative nanoparticles can be modified, treated, or coated in various ways. In some embodiments, the composition comprises surfactants that are both bound to the nanoparticles and are freely suspended in the composition fluid.

Disclosed herein are compositions comprising a first carrier fluid comprising at least one population of positively charged nanoparticles; and a second carrier fluid comprising at least one population of negatively charged nanoparticles. In some embodiments, there is a single carrier fluid containing both positively charged and negatively charged nanoparticles.

In some embodiments, the composition is an aqueous composition. In some embodiments, the composition is not a drilling fluid. In some embodiments, the composition is free of cement or other type of hardening agent. In some embodiments, the composition is free of foaming agent. In some embodiments, the composition is free of gelling agents. The composition can be present above ground, that is before being injected into a subterranean formation, or it can be present below ground, that is the composition is formed after the first and second carrier fluids are injected into a subterranean formation. The methods and order of injections of the first and second carrier fluids are described herein as non-limiting examples.

In some embodiments, the composition comprises multiple types of nanoparticle populations. In some embodiments, the composition comprises at least two populations of positively charged nanoparticles. In some embodiments, the composition comprises at least three populations of positively charged nanoparticles. In some embodiments, the composition comprises at least four populations of positively charged nanoparticles. In some embodiments, the composition comprises from about 1 to about 4 populations of positively charged nanoparticles in the first carrier fluid. In some embodiments, the composition comprises no populations of positively charged nanoparticles in the second carrier fluid. In some embodiments, the composition comprises at least two populations of negatively charged nanoparticles. In some embodiments, the composition comprises at least three populations of negatively charged nanoparticles. In some embodiments, the composition comprises at least four populations of negatively charged nanoparticles. In some embodiments, the composition comprises from about 1 to about 4 populations of negatively charged nanoparticles in the second carrier fluid. In some embodiments, the composition comprises no populations of negatively charged nanoparticles in the first carrier fluid. In some embodiments, the positively charged nanoparticles have different sizes or are different materials. In some embodiments, the negatively charged nanoparticles have different sizes or are different materials. As described herein, in some embodiments, the different particles can be in the same carrier fluid as opposed to two separate carrier fluids.

In some embodiments, the size of a nanoparticle refers to the diameter or approximate diameter of a nanoparticle. For a population of nanoparticles, this can also be referred to as a Z-average particle size, which can be measured according to routine protocols known to one skilled in the art. In some embodiments, any of the nanoparticles in the composition have a size from about 1 to about 1000 nanometers. In some embodiments, the size is measured by dynamic light scattering (DLS) (Z-average). In some embodiments, the size is measured by TEM (Transmission Electron Microscopy). In some embodiments, the particle size is less than 100 nm as measured by TEM. In some embodiments, any of the nanoparticles in the composition have a size from about 2 to about 1000 nanometers. In some embodiments, any of the nanoparticles in the composition have a size from about 3 to about 1000 nanometers. In some embodiments, any of the nanoparticles in the composition have a size from about 4 to about 1000 nanometers. In some embodiments, any of the nanoparticles in the composition have a size from about 5 to about 1000 nanometers. In some embodiments, any of the nanoparticles in the composition have a size from about 6 to about 1000 nanometers. In some embodiments, any of the nanoparticles in the composition have a size from about 7 to about 1000 nanometers. In some embodiments, any of the nanoparticles in the composition have a size from about 8 to about 1000 nanometers. In some embodiments, any of the nanoparticles in the composition have a size from about 9 to about 1000 nanometers. In some embodiments, any of the nanoparticles in the composition have a size from about 10 to about 1000 nanometers. In some embodiments, any of the nanoparticles in the composition have a size from about 20 to about 1000 nanometers. In some embodiments, any of the nanoparticles in the composition have a size from about 30 to about 1000 nanometers. In some embodiments, any of the nanoparticles in the composition have a size from about 40 to about 1000 nanometers. In some embodiments, any of the nanoparticles in the composition have a size from about 50 to about 1000 nanometers. In some embodiments, any of the nanoparticles in the composition have a size from about 60 to about 1000 nanometers. In some embodiments, any of the nanoparticles in the composition have a size from about 70 to about 1000 nanometers. In some embodiments, any of the nanoparticles in the composition have a size from about 80 to about 1000 nanometers. In some embodiments, any of the nanoparticles in the composition have a size from about 90 to about 1000 nanometers. In some embodiments, any of the nanoparticles in the composition have a size from about 100 to about 1000 nanometers. In some embodiments, any of the nanoparticles in the composition have a size from about 150 to about 1000 nanometers. In some embodiments, any of the nanoparticles in the composition have a size from about 200 to about 1000 nanometers. In some embodiments, any of the nanoparticles in the composition have a size from about 250 to about 1000 nanometers. In some embodiments, any of the nanoparticles in the composition have a size from about 1 to about 250 nanometers. In some embodiments, any of the nanoparticles in the composition have a size from about 1 to about 200 nanometers. In some embodiments, any of the nanoparticles in the composition have a size from about 1 to about 150 nanometers. In some embodiments, any of the nanoparticles in the composition have a size from about 1 to about 100 nanometers. In some embodiments, any of the nanoparticles in the composition have a size from about 1 to about 90 nanometers. In some embodiments, any of the nanoparticles in the composition have a size from about 1 to about 80 nanometers. In some embodiments, any of the nanoparticles in the composition have a size from about 1 to about 70 nanometers. In some embodiments, any of the nanoparticles in the composition have a size from about 1 to about 60 nanometers. In some embodiments, any of the nanoparticles in the composition have a size from about 1 to about 50 nanometers. In some embodiments, any of the nanoparticles in the composition have a size from about 1 to about 40 nanometers. In some embodiments, any of the nanoparticles in the composition have a size from about 1 to about 30 nanometers. In some embodiments, any of the nanoparticles in the composition have a size from about 1 to about 20 nanometers. In some embodiments, any of the nanoparticles in the composition have a size from about 1 to about 10 nanometers. In some embodiments, any of the nanoparticles in the composition have a size from about 1 to about 9 nanometers. In some embodiments, any of the nanoparticles in the composition have a size from about 1 to about 8 nanometers. In some embodiments, any of the nanoparticles in the composition have a size from about 1 to about 7 nanometers. In some embodiments, any of the nanoparticles in the composition have a size from about 1 to about 6 nanometers. In some embodiments, any of the nanoparticles in the composition have a size from about 1 to about 5 nanometers. In some embodiments, any of the nanoparticles in the composition have a size from about 1 to about 4 nanometers. In some embodiments, any of the nanoparticles in the composition have a size from about 1 to about 3 nanometers. In some embodiments, any of the nanoparticles in the composition have a size from about 1 to about 2 nanometers.

In some embodiments, a population of nanoparticles can also have the same average size value as any of the foregoing, which can be referred to as the Z-average, which can be measured by DLS as discussed above. For example, in some embodiments, the Z-average of a population of the nanoparticles is about 1 to about 1000 nanometers. In some embodiments, the Z-average of a population of the nanoparticles is about 400 to about 700 nanometers. In some embodiments, the Z-average of a population of the nanoparticles is about 450 to about 700 nanometers. In some embodiments, the Z-average of a population of the nanoparticles is about 500 to about 700 nanometers. In some embodiments, the Z-average of a population of the nanoparticles is about 550 to about 700 nanometers. In some embodiments, the Z-average of a population of the nanoparticles is about 550 to about 650 nanometers. In some embodiments, the Z-average of a population of the nanoparticles is about 575 to about 625 nanometers. In some embodiments, the Z-average of a population of the nanoparticles is about 10, 20, 30 40, 50, 100, 200, 250, 300, 350, 400, 450, 500, 525, 550, 575, or 600 nanometers. In some embodiments, the Z-average of a population of the nanoparticles is about 2 to about 300 nanometers. In some embodiments, the Z-average of a population of the nanoparticles is about 3 to about 300 nanometers. In some embodiments, the Z-average of a population of the nanoparticles is about 4 to about 300 nanometers. In some embodiments, the Z-average of a population of the nanoparticles is about 5 to about 300 nanometers. In some embodiments, the Z-average of a population of the nanoparticles is about 6 to about 300 nanometers. In some embodiments, the Z-average of a population of the nanoparticles is about 7 to about 300 nanometers. In some embodiments, the Z-average of a population of the nanoparticles is about 8 to about 300 nanometers. In some embodiments, the Z-average of a population of the nanoparticles is about 9 to about 300 nanometers. In some embodiments, the Z-average of a population of the nanoparticles is about 10 to about 300 nanometers. In some embodiments, the Z-average of a population of the nanoparticles is about 20 to about 300 nanometers. In some embodiments, the Z-average of a population of the nanoparticles is about 30 to about 300 nanometers. In some embodiments, the Z-average of a population of the nanoparticles is about 40 to about 300 nanometers. In some embodiments, the Z-average of a population of the nanoparticles is about 50 to about 300 nanometers. In some embodiments, the Z-average of a population of the nanoparticles is about 60 to about 300 nanometers. In some embodiments, the Z-average of a population of the nanoparticles is about 70 to about 300 nanometers. In some embodiments, the Z-average of a population of the nanoparticles is about 80 to about 300 nanometers. In some embodiments, the Z-average of a population of the nanoparticles is about 90 to about 300 nanometers. In some embodiments, the Z-average of a population of the nanoparticles is about 100 to about 300 nanometers. In some embodiments, the Z-average of a population of the nanoparticles is about 150 to about 300 nanometers. In some embodiments, the Z-average of a population of the nanoparticles is about 200 to about 300 nanometers. In some embodiments, the Z-average of a population of the nanoparticles is about 250 to about 300 nanometers. In some embodiments, the Z-average of a population of the nanoparticles is about 1 to about 250 nanometers. In some embodiments, the Z-average of a population of the nanoparticles is about 1 to about 200 nanometers. In some embodiments, the Z-average of a population of the nanoparticles is about 1 to about 150 nanometers. In some embodiments, the Z-average of a population of the nanoparticles is about 1 to about 100 nanometers. In some embodiments, the Z-average of a population of the nanoparticles is about 1 to about 90 nanometers. In some embodiments, the Z-average of a population of the nanoparticles is about 1 to about 80 nanometers. In some embodiments, the Z-average of a population of the nanoparticles is about 1 to about 70 nanometers. In some embodiments, the Z-average of a population of the nanoparticles is about 1 to about 60 nanometers. In some embodiments, the Z-average of a population of the nanoparticles is about 1 to about 50 nanometers. In some embodiments, the Z-average of a population of the nanoparticles is about 1 to about 40 nanometers. In some embodiments, the Z-average of a population of the nanoparticles is about 1 to about 30 nanometers. In some embodiments, the Z-average of a population of the nanoparticles is about 1 to about 20 nanometers. In some embodiments, the Z-average of a population of the nanoparticles is about 1 to about 10 nanometers. In some embodiments, the Z-average of a population of the nanoparticles is about 1 to about 9 nanometers. In some embodiments, the Z-average of a population of the nanoparticles is about 1 to about 8 nanometers. In some embodiments, the Z-average of a population of the nanoparticles is about 1 to about 7 nanometers. In some embodiments, the Z-average of a population of the nanoparticles is about 1 to about 6 nanometers. In some embodiments, the Z-average of a population of the nanoparticles is about 1 to about 5 nanometers. In some embodiments, the Z-average of a population of the nanoparticles is about 1 to about 4 nanometers. In some embodiments, the Z-average of a population of the nanoparticles is about 1 to about 3 nanometers. In some embodiments, the Z-average of a population of the nanoparticles is about 1 to about 2 nanometers.

In some embodiments, the total amount of the positively charged nanoparticles and the negatively charged nanoparticles in the composition is from about 0.001 wt % to about 5 wt % of the total composition. In some embodiments, the total amount of the positively charged nanoparticles and the negatively charged nanoparticles in the composition is from about 0.01 wt % to about 5 wt % of the total composition. In some embodiments, the total amount of the positively charged nanoparticles and the negatively charged nanoparticles in the composition is from about 0.05 wt % to about 5 wt % of the total composition. In some embodiments, the total amount of the positively charged nanoparticles and the negatively charged nanoparticles in the composition is from about 0.1 wt % to about 5 wt % of the total composition. In some embodiments, the total amount of the positively charged nanoparticles and the negatively charged nanoparticles in the composition is from about 0.5 wt % to about 5 wt % of the total composition. In some embodiments, the total amount of the positively charged nanoparticles and the negatively charged nanoparticles in the composition is from about 1 wt % to about 5 wt % of the total composition. In some embodiments, the total amount of the positively charged nanoparticles and the negatively charged nanoparticles in the composition is from about 2 wt % to about 5 wt % of the total composition. In some embodiments, the total amount of the positively charged nanoparticles and the negatively charged nanoparticles in the composition is from about 3 wt % to about 5 wt % of the total composition. In some embodiments, the total amount of the positively charged nanoparticles and the negatively charged nanoparticles in the composition is from about 4 wt % to about 5 wt % of the total composition. In some embodiments, the total amount of the positively charged nanoparticles and the negatively charged nanoparticles in the composition is from about 0.001 wt % to about 4 wt % of the total composition. In some embodiments, the total amount of the positively charged nanoparticles and the negatively charged nanoparticles in the composition is from about 0.001 wt % to about 3 wt % of the total composition. In some embodiments, the total amount of the positively charged nanoparticles and the negatively charged nanoparticles in the composition is from about 0.001 wt % to about 2 wt % of the total composition. In some embodiments, the total amount of the positively charged nanoparticles and the negatively charged nanoparticles in the composition is from about 0.001 wt % to about 1 wt % of the total composition. In some embodiments, the total amount of the positively charged nanoparticles and the negatively charged nanoparticles in the composition is from about 0.001 wt % to about 0.5 wt % of the total composition. In some embodiments, the total amount of the positively charged nanoparticles and the negatively charged nanoparticles in the composition is from about 0.001 wt % to about 0.1 wt % of the total composition. In some embodiments, the total amount of the positively charged nanoparticles and the negatively charged nanoparticles in the composition is from about 0.001 wt % to about 0.01 wt % of the total composition.

In some embodiments, the ratio of positively charged nanoparticles to negatively charged nanoparticles in the composition is about 1:1. In some embodiments, the ratio of positively charged nanoparticles to negatively charged nanoparticles in the composition is about 1.5:1. In some embodiments, the ratio of positively charged nanoparticles to negatively charged nanoparticles in the composition is about 2:1. In some embodiments, the ratio of positively charged nanoparticles to negatively charged nanoparticles in the composition is about 2.5:1. In some embodiments, the ratio of positively charged nanoparticles to negatively charged nanoparticles in the composition is about 3:1. In some embodiments, the ratio of positively charged nanoparticles to negatively charged nanoparticles in the composition is about 3.5:1. In some embodiments, the ratio of positively charged nanoparticles to negatively charged nanoparticles in the composition is about 4:1. In some embodiments, the ratio of positively charged nanoparticles to negatively charged nanoparticles in the composition is about 4.5:1. In some embodiments, the ratio of positively charged nanoparticles to negatively charged nanoparticles in the composition is about 5:1. In some embodiments, the ratio of positively charged nanoparticles to negatively charged nanoparticles in the composition is greater that 1:1. In some embodiments, the ratio of positively charged nanoparticles to negatively charged nanoparticles in the composition is greater that 2:1. In some embodiments, the ratio of positively charged nanoparticles to negatively charged nanoparticles in the composition is greater that 3:1. In some embodiments, the ratio of positively charged nanoparticles to negatively charged nanoparticles in the composition is greater that 4:1. Other ratios can also be used and adjusted based upon the specifics of the well being treated with the positive and negative nanoparticles.

In some embodiments, the ratio of positively charged nanoparticles to negatively charged nanoparticles in the composition is about 1:1.5. In some embodiments, the ratio of positively charged nanoparticles to negatively charged nanoparticles in the composition is about 1:2. In some embodiments, the ratio of positively charged nanoparticles to negatively charged nanoparticles in the composition is about 1:2.5. In some embodiments, the ratio of positively charged nanoparticles to negatively charged nanoparticles in the composition is about 1:3. In some embodiments, the ratio of positively charged nanoparticles to negatively charged nanoparticles in the composition is about 1:3.5. In some embodiments, the ratio of positively charged nanoparticles to negatively charged nanoparticles in the composition is about 1:4. In some embodiments, the ratio of positively charged nanoparticles to negatively charged nanoparticles in the composition is about 1:4.5. In some embodiments, the ratio of positively charged nanoparticles to negatively charged nanoparticles in the composition is about 1:5. In some embodiments, the ratio of positively charged nanoparticles to negatively charged nanoparticles in the composition is greater that 1:2. In some embodiments, the ratio of positively charged nanoparticles to negatively charged nanoparticles in the composition is greater that 1:3. In some embodiments, the ratio of positively charged nanoparticles to negatively charged nanoparticles in the composition is greater that 1:4. Other ratios can also be used and adjusted based upon the specifics of the well being treated with the positive and negative nanoparticles.

In some embodiments, the viscosity of the composition is from about 1.5 cP to about 300 cP. In some embodiments, the viscosity of the composition is from about 2 cP to about 300 cP. In some embodiments, the viscosity of the composition is from about 3 cP to about 300 cP. In some embodiments, the viscosity of the composition is from about 4 cP to about 300 cP. In some embodiments, the viscosity of the composition is from about 10 cP to about 300 cP. In some embodiments, the viscosity of the composition is from about 40 cP to about 300 cP. In some embodiments, the viscosity of the composition is from about 200 cP to about 300 cP. In some embodiments, the viscosity of the composition is greater than about 1.5 cP. In some embodiments, the viscosity of the composition is greater than about 2 cP. In some embodiments, the viscosity of the composition is greater than about 3 cP. In some embodiments, the viscosity of the composition is greater than about 4 cP. In some embodiments, the viscosity of the composition is greater than about 10 cP. In some embodiments, the viscosity of the composition is greater than about 40 cP. In some embodiments, the viscosity of the composition is greater than about 200 cP.

In some embodiments, any of the compositions described herein comprise at least one surfactant. In some embodiments, at least one surfactant binds to the surface of the negatively charged and/or positively charged nanoparticles. In some embodiments, at least some of the at least one surfactant is solubilized in the first and/or second carrier fluid. When prepared in a single solution the surfactant can be added to a single solution (carrier fluid) that comprises the positive and negative nanoparticles. In some embodiments, at least some of the at least one surfactant binds to the surface of both the negatively charged and positively charged nanoparticles, and a portion of the at least one surfactant is solubilized in both the first and second carrier fluids. In some embodiments, at least one surfactant is a non-foaming surfactant and/or does not produce a foam in the composition. In some embodiments, the at least one surfactant does not cause the first and/or second carrier fluids to foam. In some embodiments, the at least one surfactant is selected from the group consisting of fatty acid salts, sulfates, sulfonates, phosphoric surfactants, alkyl-ammoniums, alkyl-amines, fatty amine surfactants, and any combinations thereof. In some embodiments, the at least one surfactant comprises one or more surfactants selected from the group consisting of sodium fatty acid salt surfactant, a potassium fatty acid salt surfactant, an alkyl sulfate surfactant, an alkyl ether sulfate surfactant, a dodecyl benzene sulfonate surfactant, and an alpha olefin sulfonate surfactant. Additional surfactants include quaternary ammonium surfactant, including, but not limited to cetyltrimethylammonium bromide and the like. Other non-limiting surfactants include, for example, anionic surfactants like sodium dodecylbenzene sulfonate or nacconol 90G, which without being bound by any theory can be used with alumina nanoparticles. Other examples include, but are not limited to, sodium-toluene sulfonate, sodium benzene sulfonate, linear alkylbenzene sulfonates (LAS) or sodium dodecyl sulfate (SDS). Examples of cationic surfactants which can be used include, but are not limited to, dodecyltrimethylammonium bromide (DTAB), hexadecyltrimethylammonium bromide (HTAB), cetyltrimethylammonium chloride (CTAC), tetradecyltrimethylammonium bromide (TTAB), n-octadecyltrimethyl-ammonium bromide (OTAB), and the like. Amphoteric surfactants, sometimes referred to as zwitterionic surfactants, which carry both positive and negative charges may also be used. Examples of amphoteric surfactants which can be used include Cocamidopropyl betaine (CAPB), Cocamidopropyl hydroxysultaine (CAHS).

In some embodiments, the surfactants in the composition comprises up to about 8 wt %. In some embodiments, the surfactants in the composition comprises up to about 7 wt %. In some embodiments, the surfactants in the composition comprises up to about 6 wt %. In some embodiments, the surfactants in the composition comprises up to about 5 wt %. In some embodiments, the surfactants in the composition comprises between about 0.5 wt % and about 8 wt %. In some embodiments, the surfactants in the composition comprises between about 1 wt % and about 7 wt %. In some embodiments, the surfactants in the composition comprises between about 1 wt % and about 6 wt %. In some embodiments, the surfactants in the composition comprises between about 1 wt % and about 5 wt %.

In some embodiments, the pH of the aqueous solution is acidic. In some embodiments, the pH of the aqueous solution is between about 3 and 7. In some embodiments, the pH of the aqueous solution is between about 4 and about 6. In some embodiments, the pH of the aqueous solution is between about 5 and about 6.

In some embodiments, the positively charged and/or negatively charged nanoparticles of any of the compositions described herein comprise a surface-active agent. In some embodiments, the surface-active agent is a polymer and/or surfactant bound to the surface of the positively charged and/or negatively charged nanoparticles. In some embodiments, the surface-active agent is a haloalkane, amine, ether, aldehyde, ketone, carboxylic acid, ester, amide group, or any combination thereof.

In some embodiments, the positively and negatively charged nanoparticles of any of the compositions described herein are selected from the group consisting of aluminum, carbon, chromium, cobalt, copper, gold, iron, magnesium, nickel, platinum, silicon, silver, tin, titanium and zinc nanoparticles. In some embodiments the positively and negatively charged nanoparticles are different from each other. In some embodiments, the nanoparticles are not iron nanoparticles.

In some embodiments, any of the nanoparticles described herein are metal oxide nanoparticles. In some embodiments, any of the nanoparticles described herein are mineral oxide nanoparticles. In some embodiments, the nanoparticles are aluminum oxide, antimony dioxide, copper oxide, iron oxide, magnesium oxide, nickel oxide, silicon dioxide, titanium oxide, zinc oxide, or zirconium dioxide nanoparticles. In some embodiments, the nanoparticles are not iron oxide nanoparticles.

In some embodiments, any of the nanoparticles described herein are selected from the group consisting of $Al_2O_3$, $Al(OH)_3$, $Bi_2O_3$, $CeO_2$, $CoO$, $Co_2O_3$, $Co_3O_4$, $Cr_2O_3$, $CuO$, $Cu_2O$, $Cu(OH)_2$, $Fe_2O_3$, $Fe_3O_4$, $MgO$, $Mg(OH)_2$, $MgCO_3$, $MnO_2$, $Mn_3O_4$, $Ni(OH)_2$, $NiO$, $SiO_2$, $SnO_2$, $TiO_2$, $ZnO$, $ZnCO_3$, $ZrO_2$, and $Zr(OH)_4$. In some embodiments, any of the nanoparticles described herein are selected from the group consisting of $BaCO_3$, $BaTiO_3$, $BaSO_4$, $CoFe_2O_4$, $CaCO_3$, $MnFe_2O_4$, $MgCO_3$, $ZnCO_3$, $SrCO_3$, and $SrTiO_3$. In some embodiments, any of the nanoparticles described herein are selected from the group consisting of $Cr_3C_2$, $CrN$, $CdS$, $CuS$, $Mg_3N_2$, $Mo_2C$, $MoS_2$, $MoSi_2$, $NbC$, $SiC$, $Si_3N_4$, and $TiC$.

In some embodiments, the positively charged nanoparticles are aluminum nanoparticles. In some embodiments, the aluminum nanoparticles are aluminum oxide nanoparticles. In some embodiments, the aluminum nanoparticles are $Al_2O_3$ nanoparticles. In some embodiments, the negatively charged nanoparticles are silica nanoparticles. In some embodiments, the silica nanoparticles are silicon dioxide nanoparticles. In some embodiments, the silica nanoparticles are $SiO_2$ nanoparticles. In some embodiments, the positively charged nanoparticles are $Al_2O_3$ nanoparticles and the negatively charged nanoparticles are $SiO_2$ nanoparticles. In some embodiments, the ratio of $Al_2O_3$ nanoparticles to $SiO_2$ nanoparticles is about 4:1. In some embodiments, the ratio of $Al_2O_3$ nanoparticles to $SiO_2$ nanoparticles is about 1:4.

In some embodiments, any of the first and/or second carrier fluids described herein is a water-based carrier fluid. In some embodiments, any of the first and/or second carrier fluids described herein is an oil-based carrier fluid. In some embodiments, any carrier fluid described herein comprises one or more salts. In some embodiments, any carrier fluid described herein comprises one or more salts selected from the group consisting of NaCl, KCl, $CaCl_2$, and $MgCl_2$. In some embodiments, the temperature of the carrier fluids may be greater than about 80° C. In some embodiments, the temperature of the carrier fluids may be greater than about 100° C.

Also disclosed herein are mixtures comprising any of the compositions described herein and extractable hydrocarbons. In some embodiments, the extractable hydrocarbons are present in a subterranean formation. In some embodiments, the subterranean formation has been subject to a previous hydraulic fracturing process and/or other hydrocarbon stimulation technique. In some embodiments, the subterranean formation has not been subject to a previous hydraulic fracturing process and/or other hydrocarbon stimulation technique. In some embodiments, the extractable hydrocarbons are present in a wellbore. An extractable hydrocarbon is a hydrocarbon (e.g. natural gas, methane, or oil) that can be extracted (taken from) an underground formation, such as those described herein.

Disclosed herein are methods of treating a subterranean formation, comprising injecting into the subterranean formation any of the compositions described herein. In some embodiments, the composition breaks up deposits present in the subterranean formation. In some embodiments, the composition alters the wettability of the subterranean formation to water wet. In some embodiments, the composition increases the relative permeability of the subterranean formation to hydrocarbons. In some embodiments, break up of deposits, the alteration of the wettability of the subterranean formation to water wet, and/or the increase of the relative permeability of the subterranean formation for hydrocarbons results in the increased flow of hydrocarbons from the subterranean formation. In some embodiments, the compositions described herein can be used to treat subterranean formation damage depositions such as asphaltene, wax, and paraffin. In some embodiments, the compositions can be used to improve the absolute permeability of fractured formation. In some embodiments, the compositions can be used to improve relative permeability to hydrocarbon. The compositions described herein can also be used to increase the production of hydrocarbons from a subterranean formation that has already been subject to prior reservoir stimulation such as hydraulic fracturing or matrix stimulation. In some embodiments, the compositions can be used to enhanced oil recovery stimulation where compositions are pumped with water into injection well(s) and the oil is recovered from production well(s). In some embodiments, the compositions can be used as additives to stimulation fluids (such as hydraulic fracturing fluids) to alter rock wettability to water wet and reduce water leak-off. In some embodiments, the compositions can be injected with other treatment fluids into the formation prior to pumping the stimulation fluids.

In some embodiments, any of the compositions described herein breaks up deposits, alters the wettability of the subterranean formation to water wet, increases the relative permeability of the subterranean formation for hydrocarbons, breaks up paraffin and/or asphaltene deposits, and/or wax deposits and/or drilling fluids, and/or results in the increased flow of hydrocarbons from the subterranean formation about 2 hours to about 72 hours after injection into the subterranean formation.

In some embodiments, any of the compositions described herein breaks up deposits about 2 hours to about 72 hours after injection into the subterranean formation. In some embodiments, any of the compositions described herein breaks up deposits about 6 hours to about 72 hours after injection into the subterranean formation. In some embodiments, any of the compositions described herein breaks up deposits about 12 hours to about 72 hours after injection into the subterranean formation. In some embodiments, any of the compositions described herein breaks up deposits about 18 hours to about 72 hours after injection into the subterranean formation. In some embodiments, any of the compositions described herein breaks up deposits about 24 hours to about 72 hours after injection into the subterranean formation. In some embodiments, any of the compositions described herein breaks up deposits about 36 hours to about 72 hours after injection into the subterranean formation. In some embodiments, any of the compositions described herein breaks up deposits about 48 hours to about 72 hours after injection into the subterranean formation. In some embodiments, any of the compositions described herein breaks up deposits about 60 hours to about 72 hours after injection into the subterranean formation. In some embodiments, any of the compositions described herein breaks up deposits about 2 hours to about 60 hours after injection into the subterranean formation. In some embodiments, any of the compositions described herein breaks up deposits about 2 hours to about 48 hours after injection into the subterranean formation. In some embodiments, any of the compositions described herein breaks up deposits about 2 hours to about 36 hours after injection into the subterranean formation. In some embodiments, any of the compositions described herein breaks up deposits about 2 hours to about 24 hours after injection into the subterranean formation. In some embodiments, any of the compositions described herein breaks up deposits about 2 hours to about 12 hours after injection into the subterranean formation. In some embodiments, any of the compositions described herein breaks up deposits about 2 hours to about 6 hours after injection into the subterranean formation.

In some embodiments, any of the compositions described herein alters the wettability of the subterranean formation to water wet about 2 hours to about 72 hours after injection into the subterranean formation. In some embodiments, any of the compositions described herein alters the wettability of the subterranean formation to water wet about 6 hours to about 72 hours after injection into the subterranean formation. In some embodiments, any of the compositions described herein alters the wettability of the subterranean formation to water wet about 12 hours to about 72 hours after injection into the subterranean formation. In some embodiments, any of the compositions described herein alters the wettability of the subterranean formation to water wet about 18 hours to about 72 hours after injection into the subterranean formation. In some embodiments, any of the compositions described herein alters the wettability of the subterranean formation to water wet about 24 hours to about 72 hours after injection into the subterranean formation. In some embodiments, any of the compositions described herein alters the wettability of the subterranean formation to water wet about 36 hours to about 72 hours after injection into the subterranean formation. In some embodiments, any of the compositions described herein alters the wettability of the subterranean formation to water wet about 48 hours to about 72 hours after injection into the subterranean formation. In some embodiments, any of the compositions described herein alters the wettability of the subterranean formation to water wet about 60 hours to about 72 hours after injection into the subterranean formation. In some embodiments, any of the compositions described herein alters the wettability of the subterranean formation to water wet about 2 hours to about 60 hours after injection into the subterranean formation. In some embodiments, any of the compositions described herein alters the wettability of the subterranean formation to water wet about 2 hours to about 48 hours after injection into the subterranean formation. In some embodiments, any of the compositions described herein alters the wettability of the subterranean formation to water wet about 2 hours to about 36 hours after injection into the subterranean formation. In some embodiments, any of the compositions described herein alters the wettability of the subterranean formation to water wet about 2 hours to about 24 hours after injection into the subterranean formation. In some embodiments, any of the compositions described herein alters the wettability of the subterranean formation to water wet about 2 hours to about 12 hours after injection into the subterranean formation. In some embodiments, any of the compositions described herein alters the wettability of the subterranean formation to water wet about 2 hours to about 6 hours after injection into the subterranean formation.

In some embodiments, any of the compositions described herein increases the permeability of the subterranean formation for hydrocarbons about 2 hours to about 72 hours after injection into the subterranean formation. In some embodiments, any of the compositions described herein increases the permeability of the subterranean formation for hydrocarbons about 6 hours to about 72 hours after injection into the subterranean formation. In some embodiments, any of the compositions described herein increases the permeability of the subterranean formation for hydrocarbons about 12 hours to about 72 hours after injection into the subterranean formation. In some embodiments, any of the compositions described herein increases the permeability of the subterranean formation for hydrocarbons about 18 hours to about 72 hours after injection into the subterranean formation. In some embodiments, any of the compositions described herein increases the permeability of the subterranean formation for hydrocarbons about 24 hours to about 72 hours after injection into the subterranean formation. In some embodiments, any of the compositions described herein increases the permeability of the subterranean formation for hydrocarbons about 36 hours to about 72 hours after injection into the subterranean formation. In some embodiments, any of the compositions described herein increases the permeability of the subterranean formation for hydrocarbons about 48 hours to about 72 hours after injection into the subterranean formation. In some embodiments, any of the compositions described herein increases the permeability of the subterranean formation for hydrocarbons about 60 hours to about 72 hours after injection into the subterranean formation. In some embodiments, any of the compositions described herein increases the permeability of the subterranean formation for hydrocarbons about 2 hours to about 60 hours after injection into the subterranean formation. In some embodiments, any of the compositions described herein increases the permeability of the subterranean formation for hydrocarbons about 2 hours to about 48 hours after injection into the subterranean formation. In some embodiments, any of the compositions described herein increases the permeability of the subterranean formation for hydrocarbons about 2 hours to about 36 hours after injection into the subterranean formation. In some embodiments, any of the compositions described herein increases the permeability of the subterranean formation for hydrocarbons about 2 hours to about 24 hours after injection into the subterranean formation. In some embodiments, any of the compositions described herein increases the permeability of the subterranean formation for hydrocarbons about 2 hours to about 12 hours after injection into the subterranean formation. In some embodiments, any of the compositions described herein increases the permeability of the subterranean formation for hydrocarbons about 2 hours to about 6 hours after injection into the subterranean formation.

In some embodiments, any of the compositions described herein results in the increased flow of hydrocarbons from the subterranean formation about 2 hours to about 72 hours after injection into the subterranean formation. In some embodiments, any of the compositions described herein results in the increased flow of hydrocarbons from the subterranean formation about 6 hours to about 72 hours after injection into the subterranean formation. In some embodiments, any of the compositions described herein results in the increased flow of hydrocarbons from the subterranean formation about 12 hours to about 72 hours after injection into the subterranean formation. In some embodiments, any of the compositions described herein results in the increased flow of hydrocarbons from the subterranean formation about 18 hours to about 72 hours after injection into the subterranean formation. In some embodiments, any of the compositions described herein results in the increased flow of hydrocarbons from the subterranean formation about 24 hours to about 72 hours after injection into the subterranean formation. In some embodiments, any of the compositions described herein results in the increased flow of hydrocarbons from the subterranean formation about 36 hours to about 72 hours after injection into the subterranean formation. In some embodiments, any of the compositions described herein results in the increased flow of hydrocarbons from the subterranean formation about 48 hours to about 72 hours after injection into the subterranean formation. In some embodiments, any of the compositions described herein results in the increased flow of hydrocarbons from the subterranean formation about 60 hours to about 72 hours after injection into the subterranean formation. In some embodiments, any of the compositions described herein results in the increased flow of hydrocarbons from the subterranean formation about 2 hours to about 60 hours after injection into the subterranean formation. In some embodiments, any of the compositions described herein results in the increased flow of hydrocarbons from the subterranean formation about 2 hours to about 48 hours after injection into the subterranean formation. In some embodiments, any of the compositions described herein results in the increased flow of hydrocarbons from the subterranean formation about 2 hours to about 36 hours after injection into the subterranean formation. In some embodiments, any of the compositions described herein results in the increased flow of hydrocarbons from the subterranean formation about 2 hours to about 24 hours after injection into the subterranean formation. In some embodiments, any of the compositions described herein results in the increased flow of hydrocarbons from the subterranean formation about 2 hours to about 12 hours after injection into the subterranean formation. In some embodiments, any of the compositions described herein results in the increased flow of hydrocarbons from the subterranean formation about 2 hours to about 6 hours after injection into the subterranean formation.

Also disclosed herein are methods of extracting hydrocarbons from a subterranean formation. In some embodiments, the method comprises treating the subterranean formation comprising the hydrocarbons with any of the compositions described herein and extracting the hydrocarbons from the subterranean formation. In some embodiments, the subterranean formation has been previously stimulated and is no longer producing hydrocarbons or is not producing sufficient hydrocarbons for the formation to be used.

In some embodiments, the treating step of the methods comprises injecting the subterranean formation with the composition. In some embodiments, the treating step further comprises injecting the subterranean formation with water prior to injecting the subterranean formation with the composition. In some embodiments, the water does not comprise nanoparticles. In some embodiments, the water is used to reduce the salinity inside the subterranean formation. In some embodiments, the treating step further comprises injecting the subterranean formation with thinner prior to injecting the subterranean formation with the composition. In some embodiments, the thinner is selected from various solvents, hot oil, or combinations thereof. In some embodiments, the thinner does not comprise nanoparticles. In some embodiments, the thinner is used to reduce or loosen heavy deposits from the subterranean formation.

In some embodiments, the treating step further comprises at least two injections of the composition to the subterranean formation. In some embodiments, the at least two injections comprise an equal or approximately equal concentration of nanoparticles in their compositions. In some embodiments, the at least two injections comprise different concentrations of nanoparticles in their compositions. In some embodiments, the treating step further comprises at least three injections of any of the composition to the subterranean formation.

In some embodiments, the treating step further comprises injecting the first carrier fluid into the subterranean formation separate from the second carrier fluid. In some embodiments, the first carrier fluid is injected into the subterranean formation before the second carrier fluid. In some embodiments, the second carrier fluid is injected into the subterranean formation before the first carrier fluid. In some embodiments, a single carrier fluid is injected into the subterranean formation that comprises both the positive and negative nanoparticles.

In some embodiments, the treating step further comprises diluting the composition before injecting it into the subterranean formation. In some embodiments, the composition is diluted with a water-based diluent. In some embodiments, the composition is diluted with an oil-based diluent. In some embodiments, the solution comprising the positive and negative nanoparticles is diluted with water. In some embodiments, the solution is not diluted. In some embodiments, the solution comprising the positive and negative nanoparticles is diluted to a 1% solution to a 99% solution, or any dilution factor in between. The solution can be diluted to reduce the viscosity of the solution, which can then be injected into the subterranean formation. In some embodiments, the ratio of composition to diluent is about 1:10. In some embodiments, the ratio of composition to diluent is about 1:20. In some embodiments, the ratio of composition to diluent is about 1:30. In some embodiments, the ratio of composition to diluent is about 1:40. In some embodiments, the ratio of composition to diluent is about 1:50. In some embodiments, the ratio of composition to diluent is about 1:60. In some embodiments, the ratio of composition to diluent is about 1:70. In some embodiments, the ratio of composition to diluent is about 1:80. In some embodiments, the ratio of composition to diluent is about 190. In some embodiments, the ratio of composition to diluent is about 1:100. In some embodiments, the ratio of composition to diluent is from about 1:10 to about 1:100. In some embodiments, the solution is heated.

Also disclosed herein are methods of preparing any of the compositions described herein, comprising mixing the at least one positively charged nanoparticle into the first carrier fluid; mixing the at least one negatively charged nanoparticle into the second carrier fluid; and mixing the first and the second carrier fluid together to form the composition. In some embodiments, the step of mixing the first and the second carrier fluid together occurs prior to injecting the composition into a subterranean formation. In some embodiments, the step of mixing the first and the second carrier fluid together occurs after the first and the second carrier fluid are injected separately into a subterranean formation. In some embodiments, any of the nanoparticles described herein are mixed into any of the carrier fluids described herein by manual mixing, stirring, blending, sonication, high velocity shearing, or any combination thereof.

In some embodiments, the particles are mixed together in a single container or what would be considered a single step. That is, the positive and negative nanoparticles can be mixed together in the presence of the fluid to be used rather than making separate solutions (fluids) of the positive and negative nanoparticles and then combining the solutions to make a final composition that comprises both negative and positive nanoparticles. In some embodiments, any of the nanoparticles described herein are mixed into any of the carrier fluids described herein by manual mixing, stirring, blending, sonication, high velocity shearing, or any combination thereof. For example, a positively charged nanopowder and a negatively charged nanopowder can be mixed in an aqueous solution and mixed with various components, such as the surfactants described herein. In some embodiments, the nanopowders are mixed with a sulfonate surfactant and/or a quaternary ammonium sulfate. This mixture can, in some embodiments, be mixed in the presence of various alcohols (e.g. methanol, ethanol, butanol, isopropanol, and the like). In some embodiments, the nanopowders are mixed together in the presence of various detergents/surfactants, including non-ionic, anionic, cationic, amphoteric detergents/surfactants. In some embodiments, the detergent/surfactant could be, but not limited to, polyethylene glycol (PEG), polyvinylpyrrolidone (PVP), polyvinyl alcohol (PVA), polyacrylamide (PAM), TRITON-X 100™ (t-octylphenoxy-polyethoxyethanol), TWEEN® 20 (Polysorbate 20), or any other combination thereof.

In some embodiments, the nanopowders are mixed together with the one or more of the components described herein and above, and in the presence of polyvinylpyrrolidone or other similar polymers. Other polymers that can be used include PEG, PVA, TRITON™ X-100 (t-octylphenoxy-polyethoxyethanol) and TWEEN® 20 (Polysorbate 20), or any combination thereof. A non-ionic polymer can be replaced with an ionic surfactant. In some embodiments, the nanopowders are also mixed in the presence of one or more salts. Examples of salts include, but are not limited to, sodium chloride, calcium chloride, magnesium chloride, potassium chloride, and the like.

In some embodiments, the mixture is mixed at a rate of about 1000 to about 10000 rpm, about 2000 to about 9000 rpm, about 3000 to about 8000 rpm, about 4000 to about 7000 rpm, about 5000 to about 6000 rpm, about 4000 to about 6000 rpm, about 4500 to about 5500 rpm. In some embodiments, the mixture is mixed at a rate of about 1000, 2000, 3000, 4000, 5000, 6000, 7000, 8000, 9000, or 10000 rpm. The rpm refers to the rate that the mixer is set to, not necessarily the rpm of the solution in the mixer. In some embodiments, the nanopowders are mixed at a specific rate or a variety of rates for about 1 to about 420 minutes, about 10 to about 30 minutes, about 1, 5, 10, 15, 20, 25, 30, 40, 50, 60, 90, or 420 minutes, or any range between the numbers.

Accordingly, the present disclosure also provides for aqueous compositions comprising at least one population of positively charged nanoparticles and at least one population of negatively charged nanoparticles, wherein the aqueous composition comprises a surfactant, and wherein the aqueous composition is free of cement and foaming agents. The positively and negatively charged nanoparticles are described herein and can be any of those described herein. In some embodiments, the nanoparticles are a combination of Al and Si. In some embodiments, the nanoparticles are a combination of $Al_2O_3$ nanoparticles and $SiO_2$ nanoparticles. The average size of the nanoparticles can be as described herein. In some embodiments, the composition comprises one or more salts as described herein.

In some embodiments, the compositions and/or carrier fluids comprise polymers like, but not limited to, polyvinylpyrrolidone and the like.

The methods disclosed herein may also cover the use of the compositions described herein with hot water, hot oil, organic solvents, acids, inorganic chemicals or steam. Furthermore, the composition described herein may also be used in tubular cleanouts (e.g., wellbore, pipeline, etc.) For example, in some embodiments, the composition described herein may be used for tubular cleanouts. Specifically, the composition described herein may be injected into a wellbore, pipeline or other foreign object which had been previously introduced to the subterranean formation. In some embodiments, the composition described herein may be used as an additive to water injection in waterflood and/or other improved oil recovery (IOR) and enhanced oil recovery (EOR) methods to increase the sweep efficiency of the employed method and hence oil production. In some embodiments, the composition described herein may be used in thermal oil recovery as an additive to hot water/steam which may improve the interfacial properties between injected aqueous phase and heavy oil in place, which may lead to increased performance and/or higher recovery. In some embodiments, the composition described herein may be used to potentially enhance bitumen extraction Specifically, the composition described herein may be added as an additive in the hot water which may improve bitumen separation from sand particles by potentially reducing the interfacial tension between bitumen droplets and water. In some embodiments, the composition described herein may be used for water treatment. Specifically, the composition described herein may be added to water which may cause separation of certain impurities (organic and inorganic residues) through enhancing aggregation of such impurities and their segregation by nanoparticles.

The following examples are illustrative, but not limiting, of the methods and compositions described herein. Other suitable modifications and adaptations of the variety of conditions and parameters normally encountered in therapy and that are obvious to those skilled in the art are within the spirit and scope of the compounds, compositions, and methods described herein.

EXAMPLES

Example 1: Production of Compositions with Charged Nanoparticles

The chemicals used in these experiments; untreated fumed silica. $SiO_2$, (Cab-O-Sil EH-5, Cabot), fumed alumina, $Al_2O_3$, (SpectrAl 100, Cabot), poly(vinylpyrrolidone), PVP, (MW 40 000, Alfa Aesar), TRITON™ X-100 (t-octylphenoxy-polyethoxyethanol) (BeanTown Chemical), cetyltrimethylammonium bromide, CTAB, (98%, GFS Chemicals), sodium dodecylbenzenesulfonate, SDBS, (97.8%, Chemsavers), methanol (99%, BeanTown Chemical), 1-butanol (ACS, 99.4%, BeanTown Chemical), sodium chloride crystals, NaCl, (ACS, 99+%, Chemsavers), calcium chloride flakes, $CaCl_2.2H_2O$, (Alpha Chemicals), magnesium chloride hexahydrate, $MgCl_2.6H_2O$, (ACS, 100.46%, BeanTown Chemical), sodium hydroxide (ACS Reagent, 50% w/w, GFS Chemicals), hydrochloric acid (36 wt % in water, BeanTown Chemical), were used without further purification.

Synthesis of silica nanofluid (3-step sonication). A silica nanopowder was placed in a beaker and dissolved in distilled water using a Hielscher UP 200Ht Ultrasonic Processor at 100% amplitude. The silica powder was sonicated for 5 hours, and the average particle size was monitored for stability with a Zetasizer ZEN 3600 particle size analyzer. After 5 hours of continuous sonication, 15 g sodium dodecylbenzenesulfonate is added to the solution and the particle size was monitored every 30 minutes for an additional 1 hour. After 6 hours of sonication, 4 g TRITON™ X-100 (t-octylphenoxy-polyethoxyethanol) is added to the mixture and the average particle size was obtained every 30 minutes for an additional 1 hour and recorded as previously described. The sonication process was stopped after a total of 7 hours and the temperature of the nanofluid was recorded. While stirring, methanol, sodium chloride and calcium chloride was added to the mixture consecutively. The average particle size was monitored, and the pH of the mixture was recorded before and after adding 1M sodium hydroxide solution to the silica nanofluid to adjust to pH=10. The average particle size was analyzed and recorded. Synthesis of silica nanofluid (I-Step Sonication). In this step, another batch of the silica nanofluid was prepared using the same chemicals except that the sonication time was reduced from 7 hours to 3 hours. A silica nanopowder was placed in a beaker and dissolved in distilled water using a Scilogex magnetic stirrer, to which 15 g sodium dodecylbenzenesulfonate is added. With continuous magnetic stirring, TRITON™ X-100 (t-octylphenoxy-polyethoxyethanol), methanol, sodium chloride and calcium chloride were added to the mixture consecutively. The mixture was then sonicated at 100% amplitude for a total of 3 hours while monitoring the average particle size between 30 minutes to 1-hour interval. The pH of the mixture was recorded before and after adding 1M sodium hydroxide solution to the silica nanofluid to adjust to pH=10. The particle size of the silica nanoparticles in this 1-step sonication process was monitored for stability and compared with the average particle size obtained from the silica 3-step sonication method.

Synthesis of Alumina Nanofluid (3-Step Sonication). Alumina nanopowder was placed in a beaker and dissolved in distilled water and sonicated at 100% amplitude as previously described herein. The alumina powder was sonicated for 3 hours, and the average particle size was monitored for stability. After 3 hours of continuous sonication. 20 g cetyltrimethylammonium bromide was added to the solution and the particle size was monitored every 30 minutes for an additional 1 hour. After 4 hours of sonication, poly(vinylpyrrolidone) was added to the mixture and the average particle size was obtained every 30 minutes for an additional 1 hour and recorded as previously described. The sonication process was stopped after a total of 5 hours and the temperature recorded. While stirring butanol, sodium chloride and magnesium chloride was added to the mixture consecutively. The average particle size was monitored, and the pH of the mixture was recorded before and after adding 1M hydrochloric acid solution to the alumina nanofluid to adjust to pH=4. The average particle size was analyzed and recorded.

Synthesis of Alumina Nanofluid (1-Step Sonication). In this step, another batch of the alumina nanofluid was prepared using the same chemicals except that the sonication time was reduced from 5 hours to 2 hours. Alumina nanopowder was placed in a beaker and dissolved in distilled water using a Scilogex magnetic stirrer, to which cetyltrimethylammonium bromide was added. With continuous magnetic stirring, poly(vinylpyrrolidone), butanol, sodium chloride and magnesium chloride were added to the mixture consecutively. The mixture was then sonicated at 100% amplitude for a total of 2 hours while monitoring the average particle size every 30 minutes. The pH of the mixture was recorded before and after adding 1M hydrochloric acid solution to the alumina nanofluid to adjust to pH=4. The particle size of the alumina nanoparticles in this 1-step sonication process was monitored for stability and compared with the average particle size obtained from the alumina 3-step sonication method.

Production of final nanofluid composition for testing. Both a silica nanofluid and an alumina nanofluid were prepared using either the 3-step or the 1-step sonication methods as described above. Single nanofluid compositions comprise either the silica nanofluid or the alumina nanofluid, but not both. Mixture nanofluid compositions comprise both the alumina nanofluid and the silica nanofluid. Ratios of alumina nanoparticles to silica nanoparticles in the final mixture nanofluid range from about 1:1 to about 4:1.

Example 2: Sandstone Visual Test

This experiment was conducted to study the effect of nanofluid compositions on removing oil from rock slices. Forty slices of sandstone were saturated with oil and had their wettability altered from water wet to oil wet. The slices were immersed in different concentrations of both single and mixture nanofluid compositions that were prepared as described in Example 1, with the mixture nanofluid composition being a 4:1 ratio of alumina nanoparticles to silica nanoparticles. Additionally, the sandstone slices were exposed to differences in salinity content as well. Analysis of the volume of released oil from the slices after 24 hours of exposure to the nanofluid compositions shows the mixture nanofluid compositions work better than single nanofluid compositions in removing the oil from rock slices.

Example 3: Paraffin Removal Visual Test

This experiment was conducted to study the effect of nanofluid compositions on removing paraffin from unconsolidated sand pack. Standard test tubes were loaded with sand and paraffin wax was melted on the grains at 100° C. to coat and attached the paraffin to the sand. The test tubes were then filled with either water, a single nanofluid composition (either alumina or silica), or a mixture nanofluid composition (4:1 ratio of alumina to silica) and heated to 40° C. for 24 hours. No additional nanofluid stabilizers, such as surfactants or polymers, were added to ensure a better understanding of the removal of the paraffin from the sand by the nanofluid compositions. The results show that the mixture nanofluid composition is more effective at removing the paraffin from the sand grains' surface than either of the single nanofluid compositions or the water control.

Example 4: Interfacial Tension Force (IFT) Test

Reducing interfacial tension force (IFT) between oil and water is one of the main scopes of oil and gas recovery. The lower the IFT value, the better oil can move in porous media and pass through small pores and pore throats. IFT values were investigated on two occasions. First, IFT values were measured for a control fluid, single nanoparticle compositions, and mixture nanofluid (4:1 ratio of alumina to silica) compositions in both fresh water and salt brine. IFT measurements were performed by Dataphysics OCA 15EC optical contact angle measurement instrument. A pendant drop method was applied for which a droplet of oil was injected through a dosing needle into a surrounding aqueous phase. The injection rate was very slow (0.05-0.1 pus) to gradually enlarge the droplet to a full mature shape which gives the most accurate value. IFT was measured by measuring the shape factors (profile size and radius of curvature) as well as the density difference between two fluids which is given as an input. The results in Table 1 below show that the mixture nanofluid composition has a lower IFT value compared to either single nanofluid composition in salt brine, and therefore has the greatest capability to help oil migration in porous media.

TABLE 1

IFT (mN/m) measurements

| Base Fluid | Without Additives | Alumina Nanofluid (0.02%) | Silica Nanofluid (0.02%) | Mixture Nanofluid (Al:Si, 4:1, 0.02%) |
|---|---|---|---|---|
| Distilled Water | 20.71 | 7.36 | 19.67 | 6.30 |
| Brine (3% NaCl) | 15.69 | 10.07 | 12.48 | 8.16 |

Second, IFT values between Texas crude oil and different aqueous phases were measured. In this second investigation, two iterations of nanofluid were used: NanoClear® which is Si:Al=1:4 and a reverse ratio: Si:Al=4:1. As can be seen in Table 2, higher concentration of both iterations of nanofluids show further reduction in IFT.

TABLE 2

IFT (mN/m) measurements

| Surrounding Phase | IFT between oil & surrounding phase (mN/m) |
|---|---|
| Brine | 13.25 |
| Brine + NanoClear® (0.02%) | 7.68 |
| Brine + NanoClear® (0.1%) | 5.67 |
| Brine + Si:Al = 4:1 (0.02%) | 9.98 |
| Brine + Si:Al = 4:1 (0.1%) | 8.25 |

Example 5: Wettability Angle Alteration Test

Altering rock wettability from oil wet to water wet in rock damaged by deposits such as asphaltene or paraffin is a critical factor in hydrocarbon extraction. The more water wet the rock is, the less deposits present on grains' surface in porous media, which in turn leads to producing more hydrocarbon from a wellbore.

To study the effectiveness of single and mixture nanofluid compositions on removing the hydrocarbon from rock surface, contact angle measurements were completed on two occasions. First, sandstone core slices were immersed in crude oil samples for one week, and then were placed on a sample holder without any additional alterations or exposure to other fluids. A droplet of an aqueous nanofluid composition or a distilled water control was then placed on the core slices, and the contact angle was then measured. The method demonstrates a basis for how different aqueous nanofluid compositions would wet a specific oil-rock system. Results show that the mixture nanofluid composition has a lower contact angle degree and better performance in altering the wettability to water wet when compared to the single nanofluid compositions. Table 3 shows the contact angle for water droplet on oil saturated rock.

TABLE 3

Contact Angle Measurements (in degrees)

| Surface | Droplet | | | |
|---|---|---|---|---|
| | Distilled Water | Alumina Nanofluid (0.02%) | Silica Nanofluid (0.02%) | Mixture Nanofluid (Al:Si, 4:1, 0.02%) |
| Sandstone Rock Saturated with Crude | 87.7 | 79.7 | 87.1 | 65.9 |

Second, the contact angle was measured by placing a water droplet on an oil covered rock surface. The phase surrounding the water droplet was air. It was observed that the water droplet starts to change shape immediately, with a rate depending on the surface texture and rock porosity. To account for such changes, all measurements were done 10 seconds after placing the droplets. The method demonstrates a basis for how different aqueous nanofluid compositions would wet a specific oil-rock system. All iterations (Al, Si, Si:Al=1:4 and Si:Al=4:1) show reduction in the contact angle. Table 4 shows the contact angle for water droplet on oil saturated rock.

TABLE 4

Contact Angle Measurements (in degrees)

| Surface | Brine | Droplet | | | |
|---|---|---|---|---|---|
| | | Brine + Alumina Nanofluid (0.2%) | Brine + Silica Nanofluid (0.2%) | Brine + Mixture Nanofluid (Al:Si, 4:1, 0.2%) | Brine + Mixture Nanofluid (Al:Si, 1:4, 0.2%) |
| Eagle Ford Shale | 75.2 | 67.2 | 70.1 | 58.6 | 63.7 |

Example 6: Core Flood Test

This test is designed to study the performance of nanofluid compositions in porous media under reservoir pressure and temperature. Four tests were performed. For the first test, after performing petrophysical analysis on sandstone core, the core was loaded in the core flood equipment and initial reservoir fluid saturation was simulated. In order to have better understanding on nanofluid performance, differential pressure and permeability were measured at each run. After simulating reservoir conditions in the rock sample, an acceptable amount of asphaltene was precipitated in porous media by using different chemicals. Next, the core was flooded with a mixture nanofluid composition (4:1 ratio of alumina to silica) to study the effect of treatment fluid on removing the asphaltene damage. The data shows that the permeability of the core decreased 53.5% after inducing the damage. However, after flooding the core with treatment fluid, the permeability recovered 122%. This result shows that not only did the mixture nanofluid composition successfully remove the precipitated damage, but it also altered the rock wettability, decreased the interfacial tension force, alleviated the residual oil saturation percentage, and flushed out the trapped oil in small pores, all of which is evidence of the success of mixture nanofluid composition in removing the damage. The solution was found to be able to clean asphaltene damage and remove the damage from the porous media.

The second and third test were performed to determine the phase trapping in gray sister Berea sandstone cores. These are water wet cores, so water tends to cover the pore surface and remain in the core. As a result, water effective permeability is usually low. Test 2 and test 3 both consisted of four stages: water (or water+2% NanoClear®), oil, water (water+ NanoClear®) and oil again. In both tests, the rates were set to 0.5 ml/min except for the first stage which was done at 1 ml/min. The first stage (resembling initial water injection into a dry formation) of both tests yielded to higher water effective permeability when NanoClear® was used. Residual water was less after the first oil injection stage in both tests. The next water stage removed a little more oil when NanoClear® was present. However, the final oil stage removed more water without NanoClear®. Water with NanoClear® reduced the oil saturation more than water, in water stages.

TABLE 5

| Test 2 | Effective Permeability | Water Residual Saturation | Oil Residual Saturation |
|---|---|---|---|
| 1-Water | 1.27 mD | 100% | 0% |
| 2-Oil | 10.74 mD | 49% | 51% |
| 3-Water | 0.25 mD | 65% | 35% |
| 4-Oil | 11.24 mD | 46% | 54% |

TABLE 6

| Test 3 | Effective Permeability | Water Residual Saturation | Oil Residual Saturation |
|---|---|---|---|
| 1-Water + 2% NanoClear ® | 5.5 mD | 100% | 0% |
| 2-Oil | 27.6 mD | 47% | 53% |
| 3-Water + 2% NanoClear ® | 0.47 mD | 66% | 34% |
| 4-Oil | 11.20 mD | 53% | 47% |

The fourth test was done on a limestone core sample with 10 stages of consecutive water and oil running through the core at reservoir conditions with stage 9 being NanoClear® in water (1.5%). At this stage, NanoClear® is effective in removing more oil compared to the previous water stage by reducing oil residual saturation by 62%, showing a more effective oil removal from the pore space. Maximum oil saturation in the following stage also decreased by 40% compared to the previous oil run, confirming the wettability has been altered favoring water to oil to stick and remain in the core.

Example 7: Nanofluid Stability Test Under Reservoir Conditions

Figure 3:
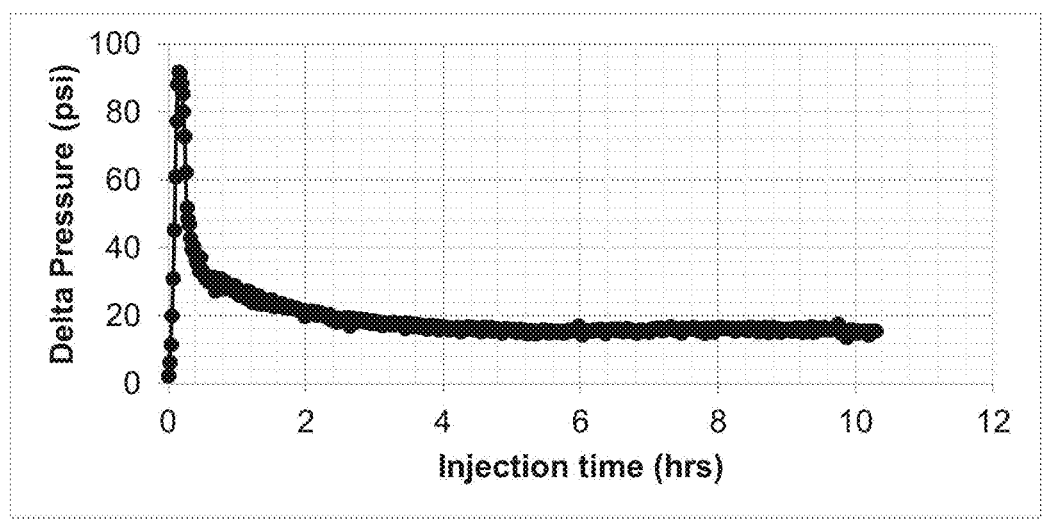
FIG. 3 depicts a graph showing the change in pressure versus injection time in a rock core sample continuously treated with a composition comprising nanoparticles.

One of the main concerns regarding using nanoparticles in subsurface studies is their stability in carrier fluid, since the nanoparticles might aggregate and deposit in porous media, thereby reducing the rock permeability significantly. To analyze the stability of studied mixture nanofluid composition under reservoir pressure and temperature conditions, the core was flooded with a mixture nanofluid composition (4:1 mixture of alumina to silica) continuously and injection pressure was monitored. Results, as depicted in the graph in FIG. 3, show after flooding the core with 1000 mL of treatment fluid (which means capability of treating a radius of 14.5 ft in the damaged formation with 20% porosity) under laminar and turbulent flow condition, no aggregation of nanoparticles in porous media was observed.

Example 8: Treatment of a Subterranean Formation with a Nanoparticle Composition (Prophetic)

A subterranean formation containing hydrocarbons has been previously accessed by hydraulic fracturing techniques and now shows a reduction in hydrocarbon output, likely due to build-up of deposits within the formation, such as asphaltene and paraffin. A nanoparticle composition is used to treat the formation to remove the deposits and restore hydrocarbon output.

To prepare the well, water is first injected into the subterranean formation. Then a first carrier fluid comprising positive nanoparticles is injected into the formation, followed thereafter by a second carrier fluid comprising negative nanoparticles. Upon combining, the first carrier fluid and the second carrier fluid form a mixed nanofluid composition in the subterranean formation. The mixed nanofluid composition comprises positive and negative nanoparticles in a ratio of about 4:1. In another embodiment, a single carrier fluid comprising positive and negative nanoparticles is injected into the formation.

The nanoparticles in the mixed nanofluid composition form wedge-like structures between the deposits and the rock surface. The nanoparticles in the mixed nanofluid composition separates or disjoins the deposits from the surrounding rock surface present in the subterranean formation. Within 6 to 48 hours, the deposits are no longer an obstruction to hydrocarbon removal from the subterranean formation.

Example 9: Treatment of a Subterranean Formation with a Complete Composition A subterranean formation containing hydrocarbons was identified. The formation has been previously accessed by stimulation techniques (e.g., fracking) and now shows a reduction in hydrocarbon output, likely due to build-up of deposits within the formation, such as asphaltene and parafin. The subterranean formation had also been previous subjected to acid stims and de-waxing jobs with limited or no success in increasing the hydrocarbon output. A nanoparticle composition disclosed herein was used to treat the formation to remove the deposits and restore hydrocarbon output.

The subterranean formation was accessed by a well with a horizontal configuration. The well had a total vertical depth of 1308 meters and a plug back total depth of 2906 meters. The subterranean formation was located in the Shaunavon formation and primarily comprised of limestone with a porosity of 13.5 percent a permeability of 0.67 millidarcy (mD) and a pay zone thickness of approximately 15 meters.

The output of the subterranean formation was monitored and recorded for 16 days prior to the introduction of one embodiment of the aqueous composition described herein. The average total fluid production prior to treatment was 34.3 barrels per day. Of that production, on average 65% was water with only 12.2 barrels per day of hydrocarbons. The hydrocarbons recovered had an average oil gravity of 23 API with a viscosity of 46.9 cP measured at 25° C., and a water salinity of 16,000 ppm.

Figure 14:
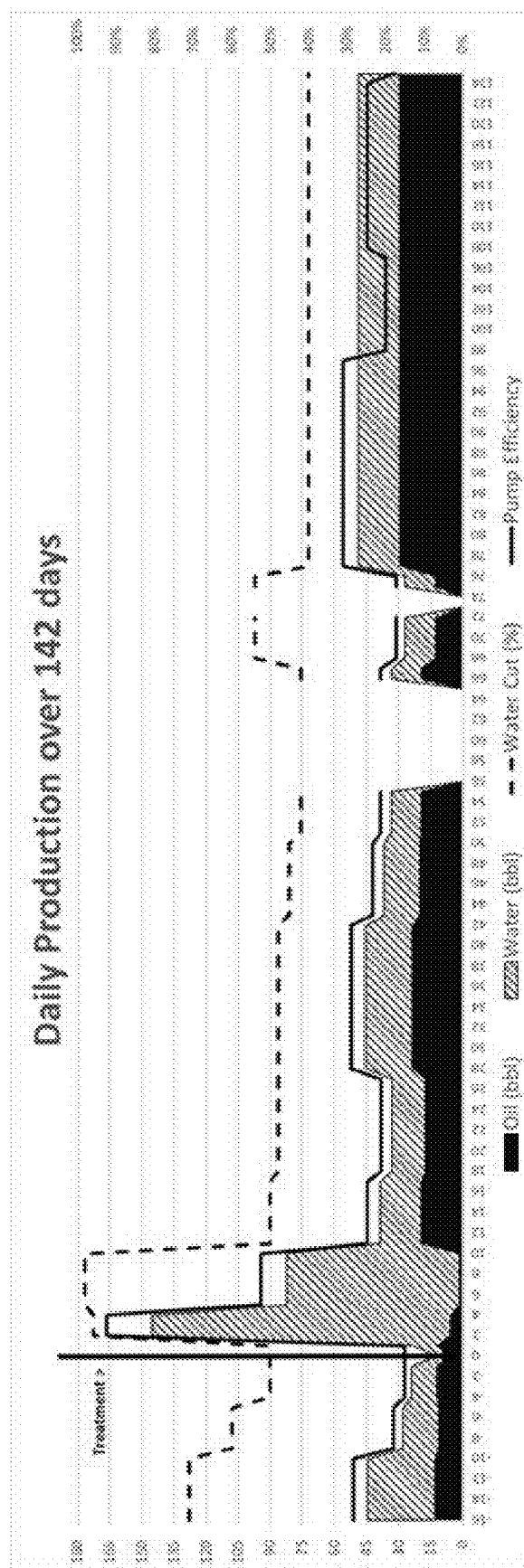
FIG. 14 depicts a graph showing the change in hydrocarbon recovery in relation to water recovery along with pump efficiency in a subterranean formation treated with an aqueous composition disclosed herein.

To prepare the well, a preflush of 30 barrels of water was first injected into the subterranean formation. Next 44 barrels of a mixed nanofluid composition comprising positive and negative nanoparticles in a ratio of about 4:1 was simultaneously injected into the formation with an additional 315 barrels of water. Finally, post flush, 190 barrels of water was injected into the subterranean formation. The output of the well was subsequently measured for 125 days. The results are depicted in FIG. 14. Furthermore, the key results from day −16 to 125 are depicted in Table 7 below.

TABLE 7

| In Barrels | Pre Treatment (16 days) | Post Treatment (125 days) | Total Change | Excluding First 10 Days | Change Excluding First 10 Days after Treatment |
|---|---|---|---|---|---|
| Avg. Oil per Day | 12.2 | 22.3 | 84% | 24.1 | 98% |
| Avg. Water per Day | 22.1 | 25 | 13% | 18.6 | −16% |
| Total Water Cut % | 65% | 53% | −12% | 44% | −21% |
| % Days of Water Cut > 49% | 100% | 19% | −81% | 11% | −89% |

Without being bound to any particular theory, it is believed that the nanoparticles in the mixed nanofluid composition form wedge-like structures between the deposits and the rock surface. The nanoparticles in the mixed nanofluid composition separates or disjoins the deposits from the surrounding rock surface present in the subterranean formation. Within 6 to 48 hours, the deposits are no longer an obstruction to hydrocarbon removal from the subterranean formation. As can be seen, when treated with such an aqueous composition hydrocarbon extraction from the subterranean formation approximately doubles and the amount of water extracted decreases by approximately 20%.

The above results were confirmed through a second case study.

In the second case study, a subterranean formation containing hydrocarbons was again identified. The formation had been previously accessed by stimulation techniques (e.g., fracking) and now shows a reduction in hydrocarbon output, likely due to build-up of deposits within the formation, such as asphaltene and paraffin. The subterranean formation had also been previous subjected to acid stims with limited or no success in increasing the hydrocarbon output. A nanoparticle composition disclosed herein was used to treat the formation to remove the deposits and restore hydrocarbon output.

The subterranean formation was accessed by a well with a vertical configuration. The well had a total vertical depth of 3500 feet (1066.8 m). The subterranean formation was located in the Seven Rivers/Queen formation and primarily comprised of mixed material with a porosity of approximately 20.0 percent and a pay zone thickness of approximately 120 feet (36.6 m).

The output of the subterranean formation was monitored and recorded for 33 days prior to the introduction of one embodiment of the aqueous composition described herein. The average total fluid production prior to treatment was approximately 130 barrels per day. Of that production, on average 71% was water with only 37.8 barrels per day of hydrocarbons. The hydrocarbons recovered had an average oil gravity of 35 API.

Figure 15:
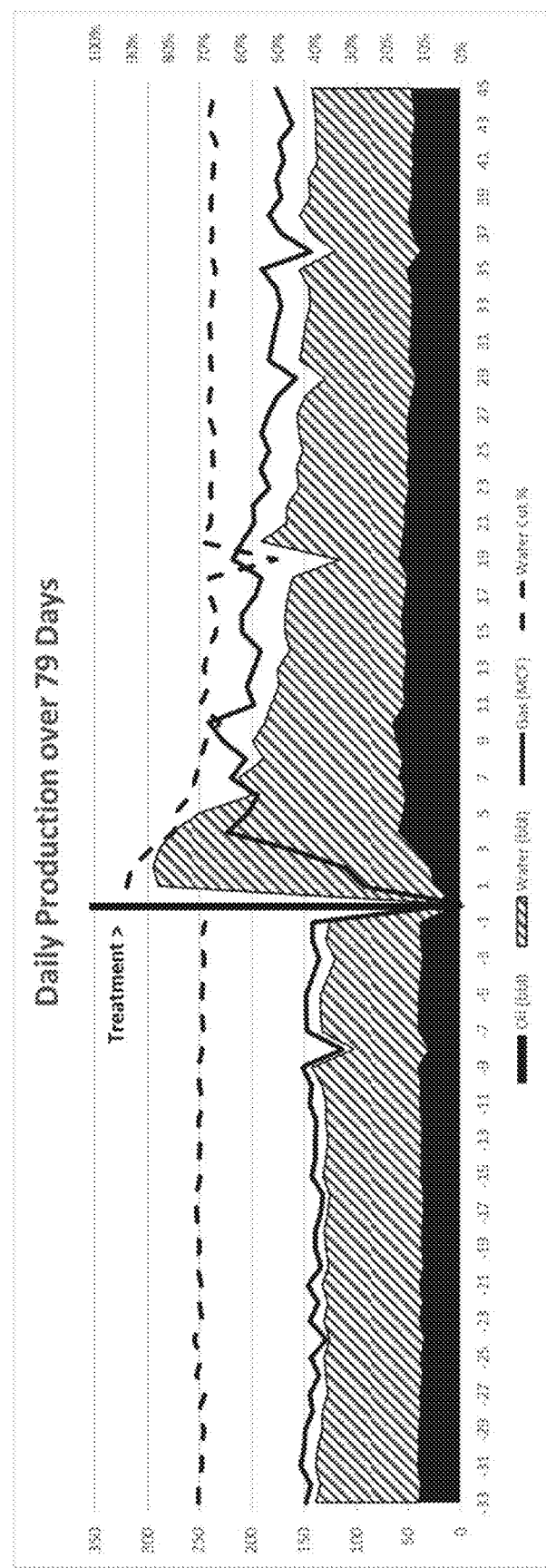
FIG. 15 depicts a graph showing the change in hydrocarbon recovery in relation to water recovery in a subterranean formation treated with an aqueous composition disclosed herein.

No preflush was used in this case study. Instead, 50 barrels of one embodiment of the disclosed aqueous composition comprising positive and negative nanoparticles in a ratio of about 4:1 along with 475 barrels of water were injected into the formation with the frac equipment onsite. The injection rate was measured at between 11-18 barrels per minute. Finally, post flush, 500 barrels of water was injected into the subterranean formation. The output of the well was subsequently measured for 45 days. The results are depicted in FIG. 15. Furthermore, the key results from day −33 to 45 are depicted in Table 8 below.

TABLE 8

| In Barrels | Pre Treatment (33 days) | Post Treatment (45 days) | Total Change | Excluding First 3 Days | Change Excluding First 3 Days after Treatment |
|---|---|---|---|---|---|
| Avg. Oil per Day | 37.8 | 49.5 | 31% | 50.7 | 34% |
| Avg. Water per Day | 92.4 | 122.7 | 33% | 113.0 | 22% |
| Total Water Cut % | 71% | 71% | 0% | 69% | -2% |
| Avg Gas per day (MCF) | 141.6 | 185.5 | 31% | 190.0 | 34% |

Example 10: Treatment of a Subterranean Formation with a Nanoparticle Composition (Prophetic)

A subterranean formation containing hydrocarbons has never been stimulated before and required stimulation techniques (such as hydraulic fracturing) to increase/allow production of hydrocarbons. A nanoparticle composition is injected with or prior to pumping treatment fluids to alter rock wettability to water wet and reduce leak-off of treatment fluids into the porous media.

Example 11: Treatment of a Subterranean Formation with a Nanoparticle Composition (Prophetic)

A subterranean formation containing hydrocarbons has experienced low recovery due to wettability alteration and/or depletion of reservoir pressures and requires enhanced oil recovery (EOR) technique to increase production. A nanoparticle composition is injected with water into injection well(s) to alter wettability to water wet and increase recovery of oil from production well(s).

Example 12: Single Step Production of Compositions with Charged Nanoparticles Materials used: Cab-o-sil untreated fumed silica, $SiO_2$, (EH-5, Cabot), spectral 100 fumed alumina. $Al_2O_3$. (Cabot), poly(vinylpyrrolidone), PVP, (MW=40,000, Alfa Aesar). TRITON™ X-100 (t-octylphenoxy-polyethoxyethanol) (BeanTown Chemical), cetyltrimethylammonium bromide, CTAB, (98%, GFS Chemicals), sodium dodecylbenzenesulfonate, SDBS, (97.8%. Chemsavers), methanol (99%, BeanTown Chemical), 1-butanol (ACS, 99.4%, BeanTown Chemical), sodium chloride crystals, NaCl, (ACS, 99+%, Chemsavers), calcium chloride flakes, $CaCl_2.2H_2O$, (Alpha Chemicals), magnesium chloride hexahydrate, $MgCl_2.6H_2O$, (ACS, 100.46%, BeanTown Chemical), sodium hydroxide (ACS Reagent, 50% w/w, GFS Chemicals), hydrochloric acid (36 wt % in water, BeanTown Chemical), were used without further purification.

Si—Al nanofluid were prepared by using a Ross 316 high shear rotor stator (fine screen) attachment with a Teflon bushing in fluid solution. A silica nanopowder and aluminum nanopowder were placed into a beaker and dissolved in distilled water using a Scilogex MS-H280-Pro magnetic stirrer, to which sodium dodecylbenzenesulfonate and cetyltrimethylammonium bromide was added. With continuous magnetic stirring TRITON™ X-100 (t-octylphenoxy-polyethoxyethanol), poly(vinylpyrrolidone), methanol, butanol, sodium chloride, calcium chloride and magnesium chloride were added to the mixture consecutively. The solution was then mixed with the rotor stator attachment and the average particle size obtained every 10 minutes. The particle size of the Si—Al nanoparticles can be monitored for stability. The particles that were produced according to this method had an average size of about 580 to about 600 nm (DLS) after either 10 minutes or 20 minutes of mixing at a speed of 5000 rpm.

Figure 4:
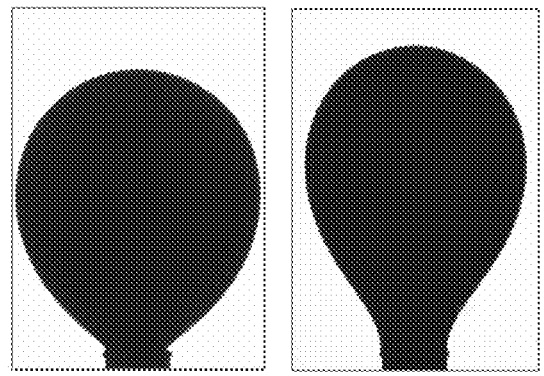
FIG. 4 depicts the interfacial tension force (IFT) between an oil droplet (black) and the surrounding water (white) (left panel) and between an oil droplet (black) and the surrounding water plus a nanofluid composition (white) (right panel).
Figure 5:
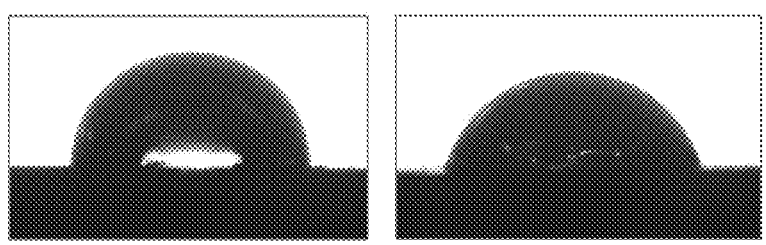
FIG. 5 depicts the contact angle between a water droplet and oil covered sandstone rock (left panel) and water plus a nanofluid composition and the oil covered sandstone rock (right panel).
Figure 6:
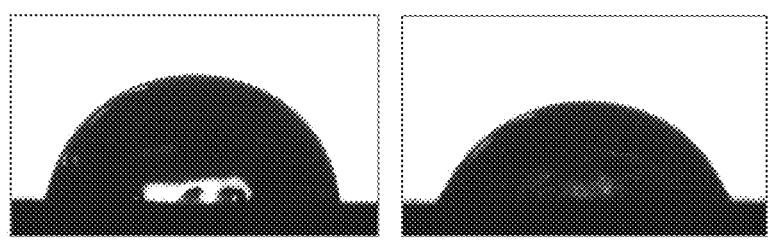
FIG. 6 depicts the contact angle of water on the core surface before (left panel) and after (right panel) a core flood.

Example 13: Nanofluid Reduces Interfacial Tension and Reduces the Contact Angle of Aqueous Phase on Oil Saturated Materials This test is designed to show the influence of a mixed nanofluid composition on surface phenomena, including interfacial tension (IFT) and contact angle using the nanofluid composition as prepared in Example 1. The interfacial tension between aqueous phase and oil is reduced when the aqueous phase contains a mixed nanofluid composition prepared as described in Example 1. A reduction in IFT between two fluids leads to a more effective mixing, therefore, the nanofluid composition will improve the effectivity of waterflood to remove oil from porous medium. The presence of the nanofluid composition also reduces the contact angle of aqueous phase on oil saturated sandstone rock surface, so it alters the wettability toward a more water-wet one, thus it enhances the effect of water in removing oil from rock grain surface. FIGS. 4 and 5 show the changes in IFT and contact angle when a diluted amount of the nanofluid composition is added (<1% for measurement purposes). FIG. 4 shows the IFT between an oil droplet (black) and the surrounding water (white). The addition of the nanofluid composition to water decreases the IFT from 20.71 mN/m (left panel-control) to 10.21 mN/m (right panel-in the presence of the nanofluid). FIG. 5 shows the contact angle between a water droplet and oil covered sandstone rock (left panel) and water plus a nanofluid composition and the oil covered sandstone rock (right panel). The addition of the nanofluid composition decreases the contact angle from 87.1 degrees (left panel) to 73.8 degrees (right panel). The additional amounts of the nanofluid composition reduces the IFT and contact angle even more. FIG. 6 shows the contact angle of water on the core surface before (left panel) and after (right panel) a core flood (which included the diluted nanofluid composition injection as well). The contact angle between a water droplet and oil covered sandstone rock before the core flood was 84.8 degrees (left panel) and was reduced to 70.4 degrees (right panel) after the core flood with the nanofluid composition.

Example 14: Nanofluids Combination is More Effective in Removing Paraffin

This experiment was conducted to study the effect of nanofluid compositions prepared according to Example 1 on removing paraffin from sand grains. Standard test tubes were loaded with sand and paraffin wax was melted on the grains at 100° C. to coat and attach the paraffin to the sand. The test tubes were then filled with either water, a single nanofluid composition (either alumina or silica), or a mixture nanofluid composition (produced as described in Example 1), and heated to 40° C. for 24 hours. No additional nanofluid stabilizers, such as surfactants or polymers, were added to ensure a better understanding of the removal of the paraffin from the sand by the nanofluid compositions. The mixture nanofluid composition was found to be significantly more effective at removing the paraffin from the sand grains' surface as compared to either of the single nanofluid compositions or the water control.

Example 15: Nanofluids Increases Oil Permeability and Other Properties

Figure 7A:
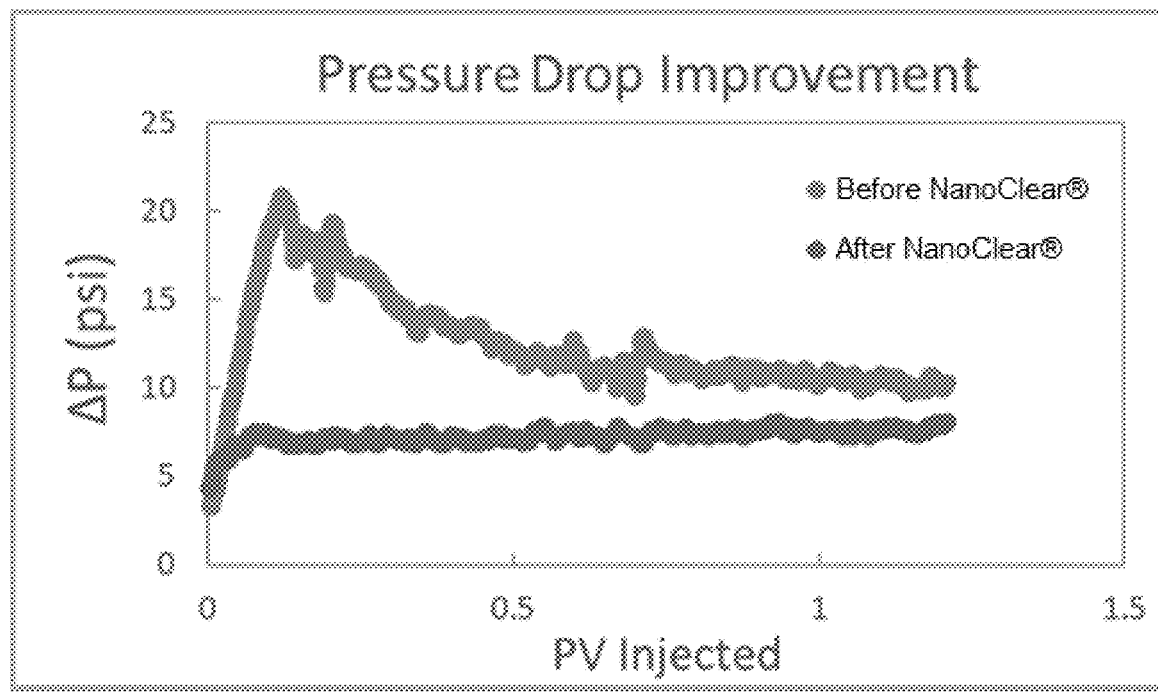
FIG. 7A depicts pressure drop improvement from use of a non-limiting example of a nanofluid composition.
Figure 7B:
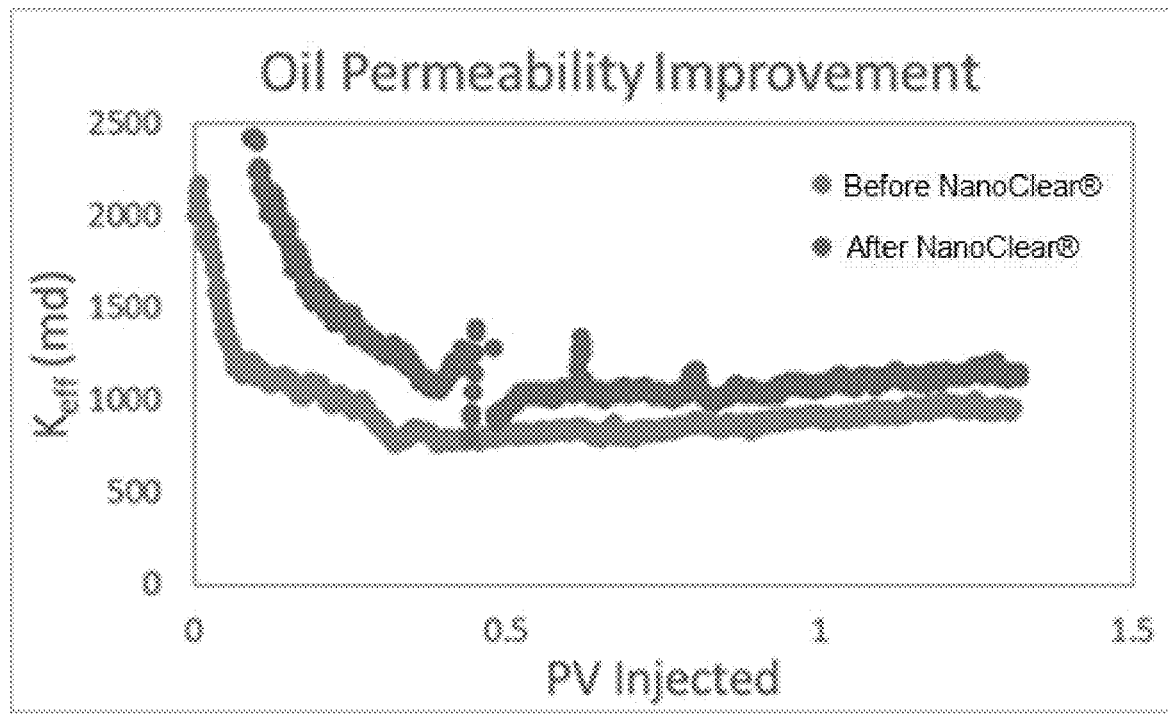
FIG. 7B depicts oil permeability improvement from use of a non-limiting example of a nanofluid composition.
Figure 7C:
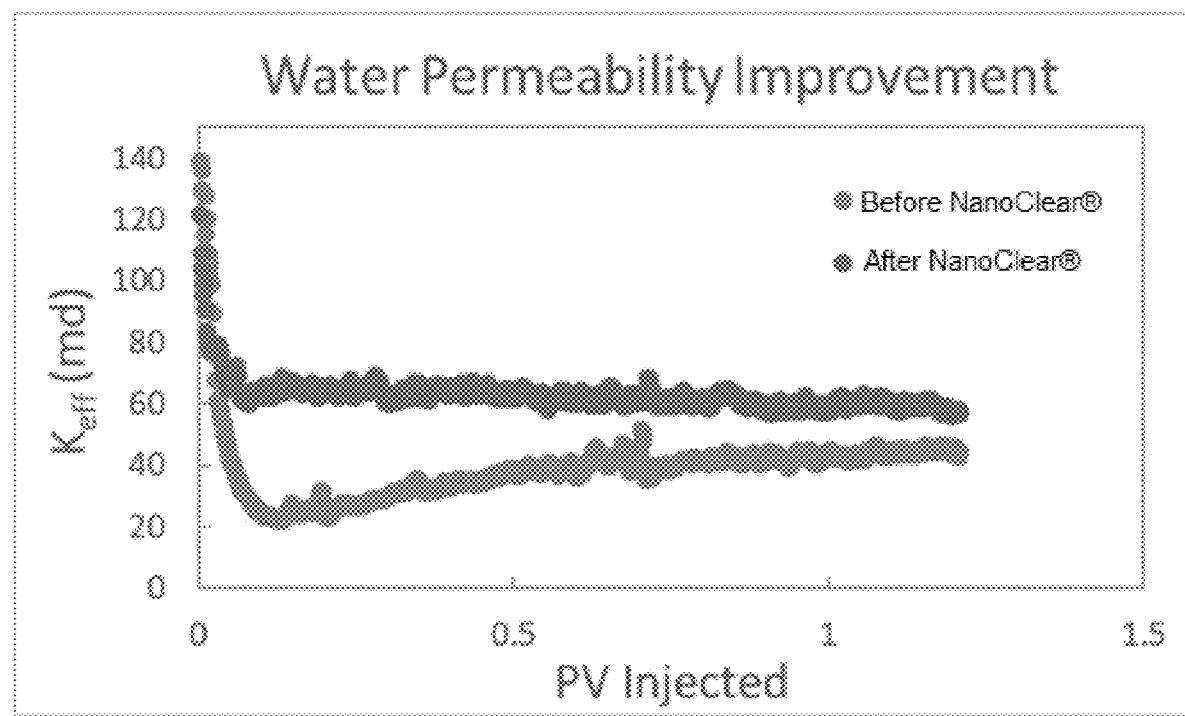
FIG. 7C depicts water permeability improvement from use of a non-limiting example of a nanofluid composition.
Figures 8A, 8B, 8C, 8D, 8E:
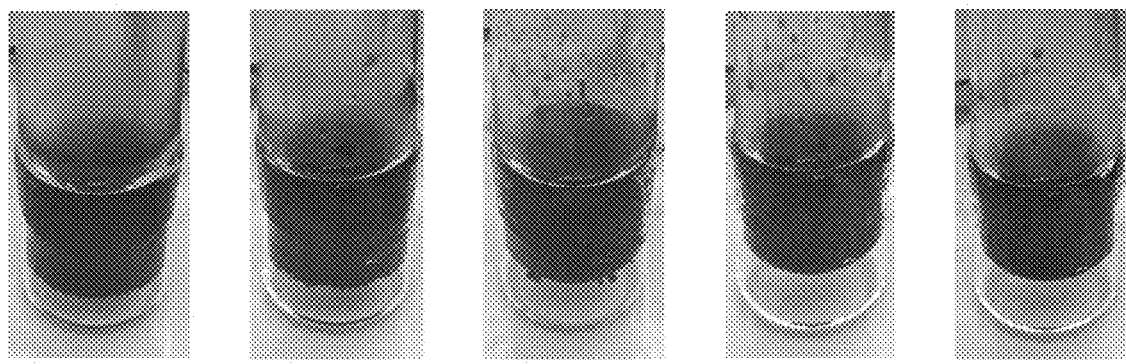
FIG. 8A is a photographic image of the phase separation of a Brine-Oil (1:1) mixture ten seconds after the mixture is combined.
FIG. 8B is a photographic image of the phase separation of a Brine-Oil (1:1) mixture thirty seconds after the mixture is combined.
FIG. 8C is a photographic image of the phase separation of a Brine-Oil (1:1) mixture one minute after the mixture is combined.
FIG. 8D is a photographic image of the phase separation of a Brine-Oil (1:1) mixture two minutes after the mixture is combined.
FIG. 8E is a photographic image of the phase separation of a Brine-Oil (1:1) mixture three minutes after the mixture is combined.

The effect of the nanofluid composition prepared according to Example 1 on fluid flow was studied through a series of core flood experiments. The tests were run at selected reservoir conditions on sandstone core samples. The core was first saturated with water and then crude oil to create a realistic two-phase saturation profile. Then formation damage was simulated by creating asphaltene deposition inside the core, having injected crude oil and n-heptane to remove the lighter hydrocarbon ends. This yielded to a higher pressure drop and lower effective permeability of oil and water. Then the nanofluid composition prepared as described in Example 1 was injected and the consecutive water flood and oil flood stages exhibited permeability restoration and lower pressure drop. This data is shown in FIG. 7. The top panel shows an 18% pressure drop improvement after treatment with the nanofluid composition. The middle panel shows a 29% increase in oil permeability after treatment with the nanofluid composition. The bottom panel shows a 22% improvement in water permeability after treatment with the nanofluid composition. These data show that the nanofluid composition is effective in its main objective of removing formation damage such as asphaltene deposition.

Example 16: Nanofluids Improve Demulsification

Different nanofluids were added in a 1-to-1 brine-oil mixture with concentration of 2% with respect to water. The solution was mixed for 30 seconds and placed in hot water bath (~160° F. or 70° C.). The results are depicted in FIGS. 8-13. As can be seen in FIGS. 8-13, certain embodiments of the disclosed composition increase the speed of the oil-water separation. In addition, the embodiments investigated provide a more clear-cut water-oil interface. Furthermore, in the embodiments investigated, higher silica ratios show a cleaner water phase after separation.

Example 17: Nanofluid Viscosity

The viscosity of a mixture nanofluid composition with a 4:1 ratio of alumina to silica (i.e., NanoClear®) was measured. The results and experimental conditions are outlined in Table 9 below:

vided herein improve the characteristics of well to improve properties that should improve and increase hydrocarbon extraction.

Various references and patents are disclosed herein, each of which are hereby incorporated by reference for the purpose that they are cited.

From the foregoing, it will be appreciated that various embodiments of the present disclosure have been described herein for purposes of illustration, and that various modifications can be made without departing from the scope and spirit of the present disclosure. Accordingly, the various embodiments disclosed herein are not intended to be limiting.

What is claimed:

1. An aqueous composition comprising:
    at least one populations of positively charged aluminum nanoparticles;
    at least one populations of negatively charged silica nanoparticles;
    a surface-active agent comprising a polymer or a surfactant;
    a detergent; and
    a water carrier fluid,
    wherein the aqueous composition is not a drilling fluid and is free of cement and foaming agents,
    wherein the ratio of the positively charged nanoparticles to the negatively charged nanoparticles is about 4:1.

2. The aqueous composition of claim 1, wherein the composition further comprises at least one alcohol; and at least one salt.

3. The aqueous composition of claim 1, wherein the positively charged aluminum nanoparticles are $Al_2O_3$ nanoparticles, or $Al(OH)_3$ nanoparticles, or any combination thereof.

4. The aqueous composition of claim 1, wherein the negatively charged nanoparticles are $SiO_2$ nanoparticles, $Si_3N_4$ nanoparticles, or SiC nanoparticles, or any combination thereof.

5. The aqueous composition of claim 1, wherein the positively charged nanoparticles are fumed aluminum oxide.

6. The aqueous composition of claim 1, wherein the negatively charged nanoparticles are amorphous silica.

7. The aqueous composition of claim 1, wherein the positively charged nanoparticles and the negatively charged nanoparticles have a size in Z-average from about 1 to about 1000 nanometers.

8. The aqueous composition of claim 1, wherein the total amount of the positively charged nanoparticles and the negatively charged nanoparticles in the aqueous composi-

TABLE 9

| Nanofluid | Nanofluid Fraction | Distilled Water Fraction | Spindle | Rotation Speed (rpm) | Torque (% of max) | Temp. (° C.) | Viscosity (cP) |
|---|---|---|---|---|---|---|---|
| NanoClear ® (10%) | 0.1 | 0.9 | ULA | 60 | 16.3 | 22.7 | 1.63 |
| NanoClear ® (20%) | 0.2 | 0.8 | ULA | 60 | 17.2 | 23.0 | 1.72 |
| NanoClear ® (30%) | 0.3 | 0.7 | ULA | 60 | 18.1 | 22.9 | 1.81 |
| NanoClear ® (40%) | 0.4 | 0.6 | ULA | 60 | 18.7 | 22.8 | 1.87 |
| NanoClear ® (50%) | 0.5 | 0.5 | ULA | 60 | 27.2 | 22.9 | 2.72 |
| NanoClear ® (60%) | 0.6 | 0.4 | ULA | 60 | 43.4 | 22.9 | 4.34 |
| NanoClear ® (70%) | 0.7 | 0.3 | ULA | 30 | 47.4 | 22.8 | 9.48 |
| NanoClear ® (80%) | 0.8 | 0.2 | ULA | 6 | 41.2 | 22.3 | 41.20 |
| NanoClear ® (100%) | 1.00 | 0.00 | LV-2 | 30 | 29.0 | 22.5 | 290.0 |

In conclusion, the nanofluid compositions prepared according to the embodiments and specific examples protion is present in an amount of about 0.001 wt % to about 5 wt %.

9. The aqueous composition of claim 1, wherein the surface-active agent is selected from the group consisting of polyvinylpyrrolidone, fatty acid salts, sulfates, sulfonates, phosphoric surfactants, alkyl-ammoniums, alkyl-amines, fatty amine surfactants, quaternary ammonium surfactant, cetyltrimethylammonium bromide, an alkyl ether sulfate surfactant, and an alpha olefin sulfonate surfactant, or a combination thereof.

10. The aqueous composition of claim 1, wherein the surface-active agent is in an amount of about 0.01 wt % to about 10 wt %.

11. The aqueous composition of claim 1, wherein the detergent is t-octylphenoxy-polyethoxyethanol.

12. The aqueous composition of claim 2, wherein the salt comprises NaCl, $CaCl_2$, KCl or $MgCl_2$ or a combination thereof.

13. The aqueous composition of claim 12, wherein the salt is in a total amount of about 0.005 wt % to about 5 wt %.

14. The aqueous composition of claim 1, wherein the pH of the aqueous composition is less than 7.

15. The aqueous composition of claim 1, wherein the viscosity of the aqueous composition is about 10 cP to about 300 cP.

16. The aqueous composition of claim 1, wherein the surface active agent is polyvinylpyrrolidone.

17. The aqueous composition of claim 1, wherein the detergent comprises a dodecyl benzene sulfonate.

18. A method of treating a subterranean formation, comprising injecting into the subterranean formation an aqueous composition of claim 1.

19. A method of preparing an aqueous composition, comprising mixing at a speed of about 1000 to about 10000 rpm a water carrier fluid with a population of positively charged aluminum nanoparticles, a populations of negatively charged silica nanoparticles, a surface-active agent comprising a polymer or a surfactant and a detergent to form the aqueous composition; wherein the ratio of the positively charged nanoparticles to the negatively charged nanoparticles is about 4:1.

20. The method of claim 19, the method further comprising mixing the population of positively charged aluminum nanoparticles, the populations of negatively charged silica nanoparticles, the surface-active agent comprising the polymer or the surfactant and the detergent with at least one alcohol and at least one salt to form the composition.

* * * * *